(12) United States Patent
Ajioka et al.

(10) Patent No.: US 8,111,258 B2
(45) Date of Patent: Feb. 7, 2012

(54) INFORMATION PROCESSING PROGRAM AND INFORMATION PROCESSING APPARATUS

(75) Inventors: Yoshitaka Ajioka, Kyoto (JP); Yasushi Ebisawa, Kyoto (JP); Kiyoshi Mizuki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 13/026,621

(22) Filed: Feb. 14, 2011

(65) Prior Publication Data
US 2011/0134116 A1 Jun. 9, 2011

Related U.S. Application Data

(62) Division of application No. 11/327,366, filed on Jan. 9, 2006, now Pat. No. 7,911,468.

(30) Foreign Application Priority Data

Mar. 2, 2005 (JP) ................................. 2005-057659

(51) Int. Cl.
*G06T 15/00* (2006.01)
(52) U.S. Cl. ........ 345/473; 345/474; 345/475; 345/619; 715/757; 715/781; 715/851
(58) Field of Classification Search .................. 345/473, 345/619, 474, 475; 715/757, 781, 851
See application file for complete search history.

(56) References Cited

U.S. PATENT DOCUMENTS

| | | | |
|---|---|---|---|
| 5,003,498 A | 3/1991 | Ota et al. | |
| 5,293,529 A | 3/1994 | Yoshimura et al. | |
| 5,588,098 A | 12/1996 | Chen et al. | |
| 5,712,965 A | 1/1998 | Fujita et al. | |
| 6,141,019 A | 10/2000 | Roseborough et al. | |
| 6,434,597 B1 | 8/2002 | Hachiya et al. | |
| 6,535,907 B1 | 3/2003 | Hachiya et al. | |
| 6,577,328 B2 | 6/2003 | Matsuda et al. | |
| 6,931,656 B1 | 8/2005 | Eshelman et al. | |
| 7,136,786 B2 | 11/2006 | Frisken et al. | |
| 7,215,325 B2 | 5/2007 | Kim | |
| 7,577,913 B1* | 8/2009 | Donoho | 715/757 |
| 7,814,436 B2* | 10/2010 | Schrag et al. | 715/851 |
| 7,966,570 B2* | 6/2011 | Doyle et al. | 715/781 |

FOREIGN PATENT DOCUMENTS

| | | |
|---|---|---|
| JP | 62-164166 | 7/1987 |
| JP | 5-73661 A | 3/1993 |
| JP | 6-60164 A | 3/1994 |
| JP | 8-16826 A | 1/1996 |

(Continued)

*Primary Examiner* — Phu Nguyen
(74) *Attorney, Agent, or Firm* — Nixon & Vanderhye P.C.

(57) ABSTRACT

As a virtual plane used when converting a designation point, which is a touched position on a touch panel, into a control point, in a virtual three dimensional space, used for controlling a movement of an object, a first virtual plane is used when a ball is an object to be controlled; a second virtual plane is used when an object to be operated is a dog and an action mode thereof is an attention mode; a third virtual plane is used when the object to be operated is the dog and the action mode thereof is a lick mode; a fourth virtual plane is used when the object to be operated is the dog and the action mode thereof is a rope shake mode; and a fifth virtual plane is used when the object to be operated is the dog and the action mode thereof is a circle mode.

12 Claims, 19 Drawing Sheets

FOREIGN PATENT DOCUMENTS

| | | |
|---|---|---|
| JP | 8-110959 | 4/1996 |
| JP | 10-293864 | 11/1998 |
| JP | 10-334280 A | 12/1998 |
| JP | 2004-259065 | 9/2004 |

* cited by examiner

FIG. 8

| OBJECT TO BE CONTROLLED | ACTION MODE | VIRTUAL PLANE USED FOR CALCULATION |
|---|---|---|
| BALL | — | FIRST VIRTUAL PLANE |
| ROPE | — | FIRST VIRTUAL PLANE |
| TOWEL | FREE MODE | FIRST VIRTUAL PLANE |
| TOWEL | BITTEN MODE | FIFTH VIRTUAL PLANE |
| DOG | NORMAL MODE | — |
| DOG | ATTENTION MODE | SECOND VIRTUAL PLANE |
| DOG | LICK MODE | THIRD VIRTUAL PLANE |
| DOG | ROPE SHAKE MODE | FOURTH VIRTUAL PLANE |
| DOG | BITE MODE | — |
| DOG | CIRCLE MODE | FIFTH VIRTUAL PLANE |

INFORMATION PROCESSING PROGRAM AND INFORMATION PROCESSING APPARATUS

CROSS-REFERENCES TO RELATED APPLICATIONS

This application is a divisional of application Ser. No. 11/327,366, filed Jan. 9, 2006, which claims priority to Japanese Patent Application No. 2005-057659, filed Mar. 2, 2005, the entire contents of which are hereby incorporated by reference.

BACKGROUND

1. Field of the Technology

The present technology relates to a technique for operating an object, in a three dimensional space, displayed on a two dimensional screen.

2. Description of the Background Art

Conventionally, there has been a technique for operating, through designating a predetermined coordinate position on a two dimensional screen by using a pointing device such as a mouse or a touch panel, an object, in a virtual three dimensional space, displayed on the screen.

For example, a technique for moving, rotating, enlarging, or downsizing a 3D object by designating a single coordinate position on a touch panel is disclosed in Japanese Laid-Open Patent Publication No. 2004-259065.

Also, in Japanese Laid-Open Patent Publication No. 10-293864, disclosed is a technique in which an operation coordinate system (x axis, y axis, z axis) for an object positioned in a three dimensional space is provided in the space, and the object is rotated by designating a desired axis as an axis of rotation, and then drawing an end portion of an arrow of one of the other axes to a desired rotation direction.

However, according to the technique disclosed in the above-described Japanese Laid-Open Patent Publication No. 2004-259065, when, for example, the 3D object is moved, a direction and a speed of the movement thereof is merely determined in accordance with the designated coordinate position, and therefore, an intuitive sense of controlling the 3D object, i.e., a user holds the object with the hand in order to move the object, cannot be obtained.

Also, in the technique disclosed in the above-described Japanese Laid-Open Patent Publication No. 10-293864, when the object is rotated to the desired direction, a position and an angle of the operation coordinate system has to be firstly set, and therefore, there has been a problem that the number of required procedures for the operation is increased.

SUMMARY

Therefore, a feature of an exemplary embodiment presented herein is to enhance controllability when operating an object in a virtual three dimensional space with a pointing device, and to enable an easy and appropriate operation for the object.

To attain the feature mentioned above, an exemplary embodiment employs the following configurations. Reference numerals in parentheses show a corresponding relationship with the drawings to help understand the exemplary embodiment presented herein, and are not in any way limiting the scope of the exemplary embodiment.

A first aspect of an exemplary embodiment is directed to a computer readable storage medium storing an information processing program (41) for a computer (21) to execute: a display step (S72), detection steps (S14, S22, S38, S48, S56, S76, S88), conversion steps (S16, S24, S30, S40, S50, S58, S78, S90), and control steps (S18, S26, S32, S42, S52, S60, S66, S70, S80, S92). The display step is a step of displaying, on a display screen (12), an image, viewed from a virtual camera, of an object positioned in a virtual three dimensional space. The detection step is a step of detecting a designation point represented in two dimensional coordinates by using an output signal from a pointing device (15). The conversion step is a step of converting, by a predetermined calculation process, the designation point to at least one control point represented in three dimensional coordinates. The control step is a step of controlling a movement of the object by using the control point. The control point converted in the conversion step is a point, in the virtual three dimensional space, displayed on a position identical to a position of the designation point on the display screen, and the position for the control point along a depth direction changes in accordance with a condition.

As a typical method for generating the image, viewed from the virtual camera, of the object positioned in the virtual three dimensional space, a method for converting vertex coordinates (world coordinate system) of each polygon composing the object into a camera coordinate system, and then, projection transforming the converted camera coordinate system onto a virtual screen can be given. In such a coordinate conversion, camera setting information indicative of a position, an inclination (rotation angle), a direction (gaze direction), an angle of view, or the like of the virtual camera is appropriately used.

Also, as the pointing device, a touch panel or a mouse can be used, for example.

Also, the meaning of changing in accordance with a condition at least includes: changes according to a use of the control point in the control step; changes depending on a type of an object to be controlled in the control step; and changes depending on an action mode of the object, and further includes changes according to a time sequence.

In a second aspect of an exemplary embodiment based on the first aspect, the position for the control point, converted in the conversion step, along a depth direction changes in accordance with a use of the control point in the control step.

In a third aspect of an exemplary embodiment based on the first aspect, the position for the control point, converted in the conversion step, along the depth direction changes depending on a type of the object to be controlled in the control step.

In a fourth aspect of an exemplary embodiment based on the first aspect, the information processing program causes the computer to further execute a step of setting and updating an action mode of the object, and storing the set or updated action mode in a storage device, and the position for the control point, converted in the conversion step, along the depth direction changes depending on the action mode stored in the storage device.

In a fifth aspect of an exemplary embodiment based on the first aspect, the conversion step includes a step of converting the designation point into a base control point represented in three dimensional coordinates, a step of obtaining a straight line connecting between the base control point and a position of the virtual camera, and a step of obtaining an intersection point between the straight line and a virtual plane provided in the virtual three dimensional space (FIG. 12), and a position or a shape of the virtual plane changes in accordance with a condition. Here, the virtual plane may be a flat surface, or a curved surface.

In a sixth aspect of an exemplary embodiment based on the fifth aspect, the information processing program causes the computer to further execute a step of setting and updating the action mode of the object (S68), and storing the set or updated action mode (51) in the storage device (24), and a relative position of the virtual plane with respect to the object changes depending on the action mode stored in the storage device.

In a seventh aspect of an exemplary embodiment based on the first aspect, in the conversion step, the designation point detected in the detection step is converted to a first control point for controlling a first object and a second control point for controlling a second object, both the first and the second control points converted in the conversion step are points, in the virtual three dimensional space, displayed on a position identical to the position of the designation point on the display screen, and, in the control step, the first and the second objects are individually and simultaneously controlled by respectively using the first and the second control points (FIG. 14).

An eighth aspect of an exemplary embodiment is directed to an information processing apparatus including the display screen (12), the pointing device (15), display control means (21), detection means (21), conversion means (21), and control means (21). The display control means is means for displaying, on the display screen, an image, viewed from the virtual camera, of an object positioned in the virtual three dimensional space. The detection means is means for detecting the designation point represented in two dimensional coordinates by using an output signal from the pointing device. The conversion means is means for converting, by a predetermined calculation process, the designation point to at least one control point represented in three dimensional coordinates. The control means is means for controlling a movement of the object by using the control point. The control point converted by the conversion means is a point, in the virtual three dimensional space, displayed on the position identical to the position of the designation point on the display screen, and the position for the converted control point along the depth direction changes in accordance with a condition.

A ninth aspect of an exemplary embodiment is directed to a computer readable storage medium storing the information processing program for the computer (21) to execute a display step, a detection step, a conversion step, and a control step. The display step is a step of displaying, on the screen (12), an image, viewed from the virtual camera, of at least one object positioned in the virtual three dimensional space. The detection step is a step of detecting a designation point represented in two dimensional coordinates by using an output signal from the pointing device (15). The conversion step is a step of converting, by a predetermined calculation process, the designation point to a plurality of control points represented in three dimensional coordinates. The control step is a step of controlling a movement of the at least one object by using the control point. In the conversion step, the designation point detected in the detection step is converted to a first control point and a second control point, and in the control step, the movement of the at least one object is controlled by using the first and the second control points (FIG. 21).

In a tenth aspect of an exemplary embodiment based on the second aspect, in the control step, the first and the second objects positioned in the virtual three dimensional space are individually and simultaneously controlled by respectively using the first and the second control points (FIG. 21).

An eleventh aspect of an exemplary embodiment is directed to an information processing apparatus including the display screen (12), the pointing device (15), the display control means (21), the detection means (21), the conversion means (21), and the control means (21). The display control means is means for displaying, on the display screen, an image, viewed from the virtual camera, of at least one object positioned in the virtual three dimensional space. The detection means is means for detecting a designation point represented in two dimensional coordinates by using an output signal from the pointing device. The conversion means is means for converting, by the predetermined calculation process, a designation point into a plurality of control points represented in three dimensional coordinates. The control means is means for controlling the movement of the at least one object by using the control point. The conversion means converts the designation point detected by the detection means into a first control point and a second control point, and the control means controls the movement of the at least one object by using the first and the second control points (FIG. 21).

According to the first aspect of an exemplary embodiment, a position for a control point, corresponding to a designation point, along a depth direction automatically changes in accordance with a condition, and therefore, an operator can easily and appropriately control a movement of the object without having a trouble of designating a position along the depth direction for the control point.

According to the second aspect of an exemplary embodiment, the position for the control point, corresponding to the designation point, along the depth direction changes according to a use of the control point, and therefore, even in a case where the control point is used for various purposes, the operator can easily and appropriately control the movement of the object without having a trouble of designating the position for the control point along the depth direction to a best position in accordance with the various use.

According to the third aspect of an exemplary embodiment, the position for the control point, corresponding to the designation point, along the depth direction changes according to a type of an object to be controlled, and therefore, the operator can easily and appropriately control the movement of the object without having a trouble of designating the position for the control point along the depth direction to a best position in accordance with the type of the object.

According to the fourth aspect of an exemplary embodiment, the position for the control point, corresponding to the designation point, along the depth direction changes according to an action mode of the object to be controlled, and therefore, the operator can easily and appropriately control the movement of the object without having a trouble of designating the position for the control point along the depth direction to a best position in accordance with the action mode of the object.

According to the fifth aspect of an exemplary embodiment, the designation point can be converted to the control point by a uniformed scheme, whereby an algorithm used for a coordinate conversion can be simplified.

According to the sixth aspect of an exemplary embodiment, a relative position for a virtual plane with respect to the object changes in accordance with the action mode of the object, thereby allowing a more appropriate control of the movement of the object according to the action mode.

According to the seventh aspect of an exemplary embodiment, two objects in the virtual three dimensional space can be easily operated in a simultaneous and synchronous manner by using a pointing device. Also, the positions, on the screen, of the designation point and the two control points converted from the designation point are identical to each other, and therefore, the operator can easily grasp the positions of the two control points, thereby allowing a high controllability.

According to the eighth aspect of an exemplary embodiment, an effect similar to that in the first aspect can be obtained.

According to the ninth aspect of an exemplary embodiment, by using the two control points converted from the designation point, at least one object in the virtual three dimensional space can be operated, and therefore, various operations can be performed with the at least one object.

According to the tenth aspect of an exemplary embodiment, the two objects in the virtual three dimensional space can be easily operated in a simultaneous and a synchronous manner by using the pointing device.

According to the eleventh aspect of an exemplary embodiment, an effect similar to that in the ninth aspect can be obtained.

These and other features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 is a diagram illustrating virtual plane information 46 stored in the RAM 24 in detail;

DETAILED DESCRIPTION

Hereinafter, a configuration and an operation of a game apparatus according to an exemplary embodiment are described.

Figure 1:
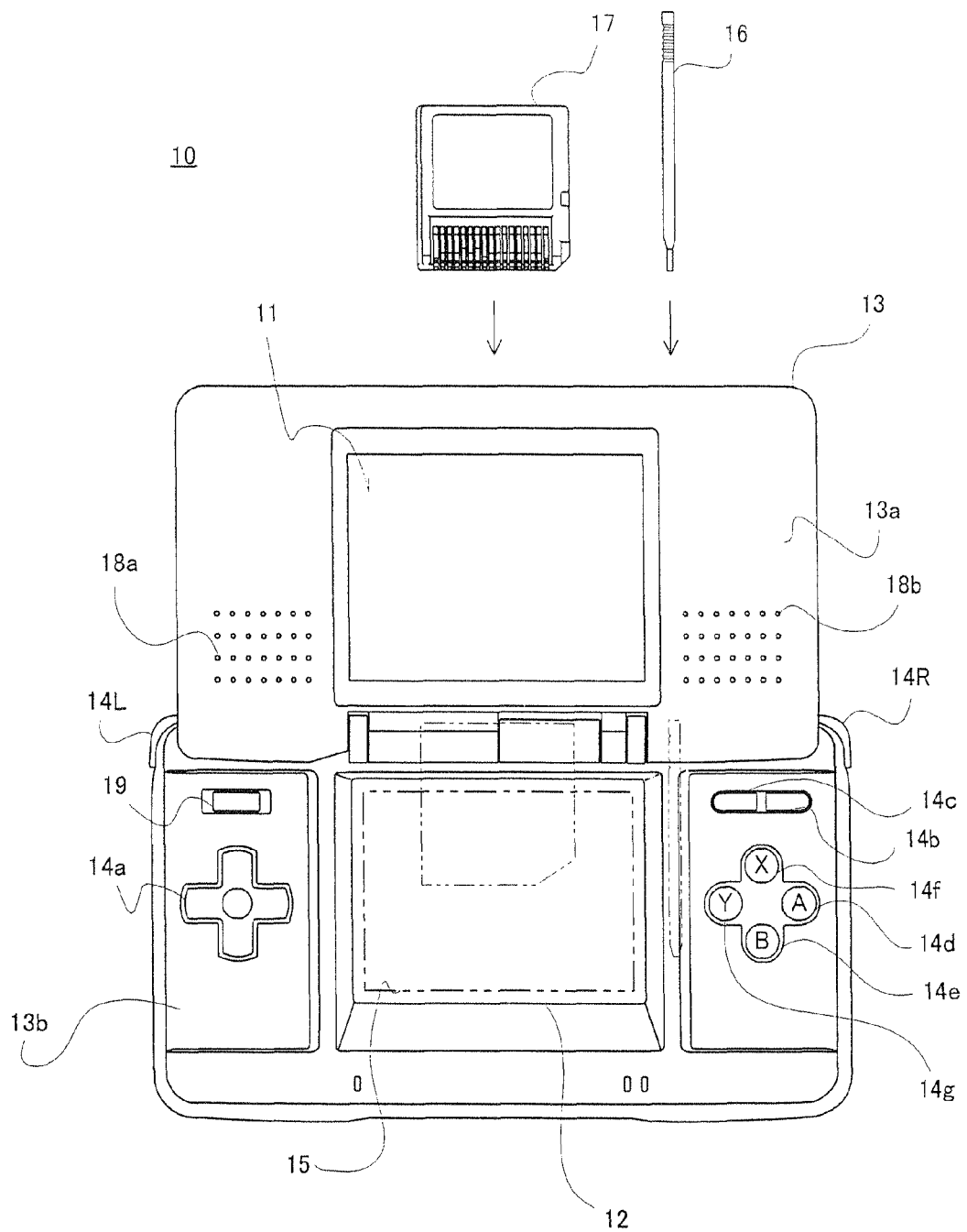
FIG. 1 is a view showing an outer appearance of a game apparatus according to an exemplary embodiment.

FIG. 1 is a view showing an outer appearance of the game apparatus according to an exemplary embodiment. In FIG. 1, a game apparatus 10 includes a first Liquid Crystal Display (LCD: liquid crystal display device) 11, and a second LCD 12. A housing 13 is provided with an upper housing 13a and a lower housing 13b, the first LCD 11 is accommodated in the upper housing 13a, and the second LCD 12 is accommodated in the lower housing 13b. A resolution for each of the first LCD 11 and the second LCD 12 is 256 dots×192 dots. In the present embodiment, an LCD is used as a display device, but another arbitrary display device such as, for example, a display device using an Electro Luminescence (EL: Electroluminescence) or the like can be employed. Also, an arbitrary resolution can be employed.

In the upper housing 13a, provided are sound holes 18a and 18b for outputting a sound from a pair of loudspeakers (30a and 30b in FIG. 2) described later.

In the lower housing 13b, provided as input devices are a cross switch 14a, a start switch 14b, a select switch 14c, an A button 14d, a B button 14e, an X button 14f, a Y button 14g, an L button 14L, and an R button 14R. Also, as further input devices, a touch panel 15 is provided on a screen of the second LCD 12. Also, in the lower housing 13b, a power switch 19, and insertion slots for accommodating a memory card 17 and a stick 16 respectively are also provided.

As for the touch panel 15, an arbitrary type such as, for example, a resistive film type, an optical type (infrared type), or a capacitive coupling type can be employed. The touch panel 15 has a function of outputting, when a surface thereof is touched by the stick 16, coordinate data corresponding to the touched position. Hereinafter, although the description takes place based on an assumption that a player operates the touch panel 15 with the stick 16, it is certainly possible to operate the touch panel 15 with a pen (stylus pen) or a finger instead of the stick 16. In the present embodiment, the touch panel 15 having, similar to the resolution of the second LCD 12, a resolution (detection accuracy) of 256 dots.times.102 dots is employed. Note that the resolution for the touch panel 15 and that for the second LCD 12 do not always need to be matched.

The memory card 17 is a storage medium storing a game program therein, and detachably inserted to the insertion slot provided in the lower housing 13b.

Figure 2:
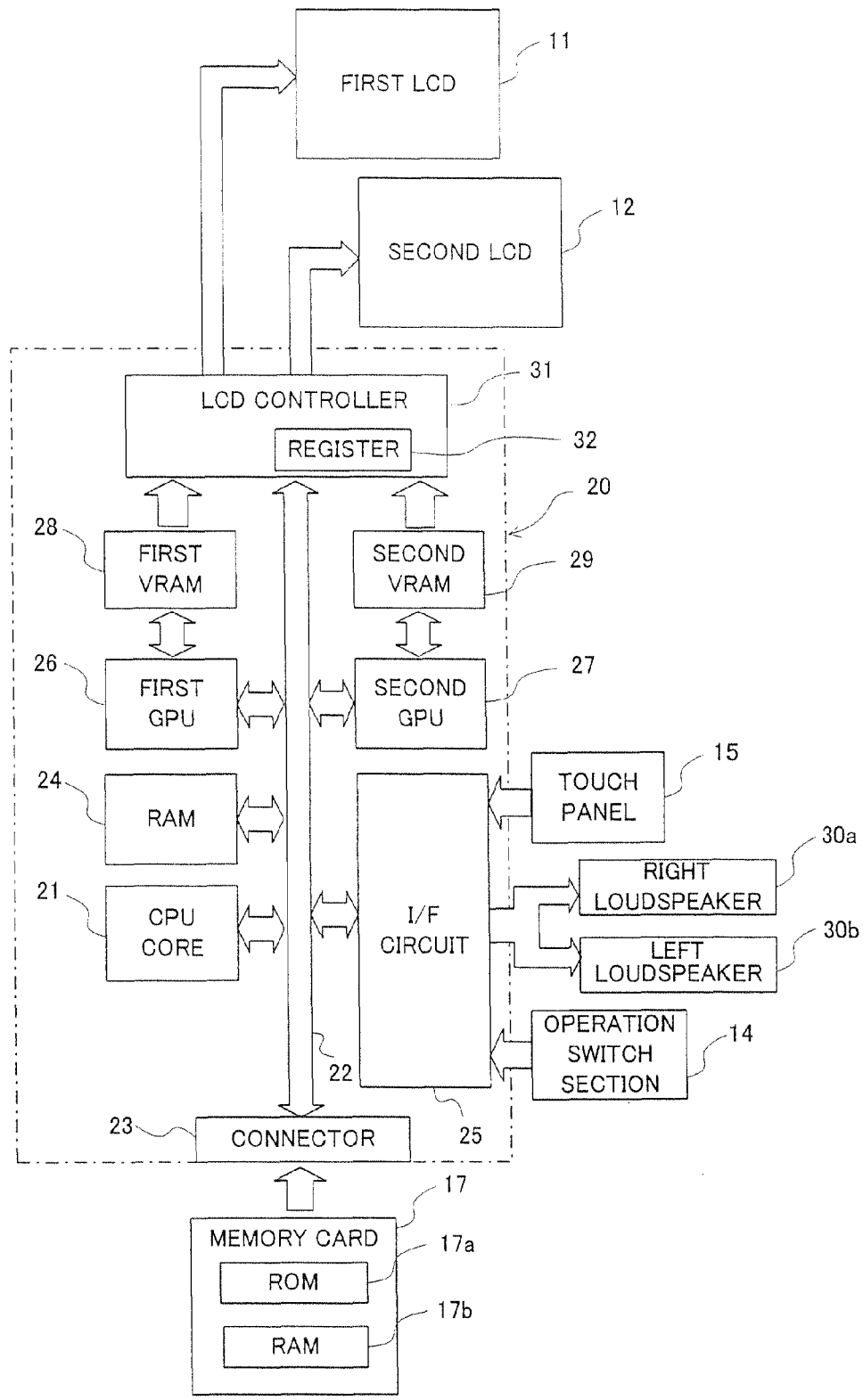
FIG. 2 is a block diagram illustrating an internal structure of the game apparatus according to an exemplary embodiment.

Next, referring to FIG. 2, an internal structure of the game apparatus 10 is described.

In FIG. 2, a CPU core 21 is mounted on an electronic circuit board 20 accommodated in the housing 13. Via a bus 22, the CPU core 21 is connected to a connector 23, an input/output interface circuit (denoted as an I/F circuit in the drawings) 25, a first Graphics Processing Unit (GPU) 26, a second GPU 27, a RAM 24, and an LCD controller 31. The memory card 17 is detachably connected to the connector 23. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. In addition to the game program, stored in the RAM 24 are temporary data obtained by the CPU core 21 executing the game program and data for generating game images. The touch panel 15, a right loudspeaker 30a, a left loudspeaker 30b, and an operation switch section 14 including the cross switch 14a, the A button 14d, and the like in FIG. 1 are connected to the I/F circuit 25. The right loudspeaker 30a and the left loudspeaker 30b are respectively placed inside the sound holes 18a and 18b.

The first GPU 26 is connected to a first Video RAM (VRAM) 28, and the second GPU 27 is connected to a second VRAM 29. In accordance with an instruction from the CPU core 21, the first GPU 26 generates a first game image using the data stored in the RAM 24 for generating a game image, and writes image data into the first VRAM 28. Similarly, in accordance with an instruction from the CPU core 21, the second GPU 27 generates a second game image, and writes image data into the second VRAM 29. The first VRAM 28 and the second VRAM 29 are connected to the LCD controller 31.

The LCD controller 31 includes a register 32. The register 32 stores a value "0" or "1" in accordance with an instruction from the CPU core 21. If the value in the register 32 is "0", the LCD controller 31 outputs, to the first LCD 11, the first game image written by the first VRAM 28, and outputs, to the second LCD 12, the second game image written by the second VRAM 29. If the value in the register 32 is "1", the LCD controller 31 outputs, to the second LCD 12, the first game image written by the first VRAM 28, and outputs, to the first LCD 11, the second game image written by the second VRAM 29.

Note that the above described structure of the game apparatus 10 is merely an example, and the exemplary embodiment can be applied to an arbitrary information processing apparatus having a pointing device (not limited to a touch panel, and may, for example, be a mouse, a touch pad, a joy stick, or the like) and a display device. Also, the game program of the exemplary embodiment is not only supplied to the information processing apparatus via an external storage medium such as the memory card 17, but also supplied to the information processing apparatus via a wired or a wireless communication line, or may also be previously stored in a nonvolatile storage device inside the information processing apparatus.

Figure 3:
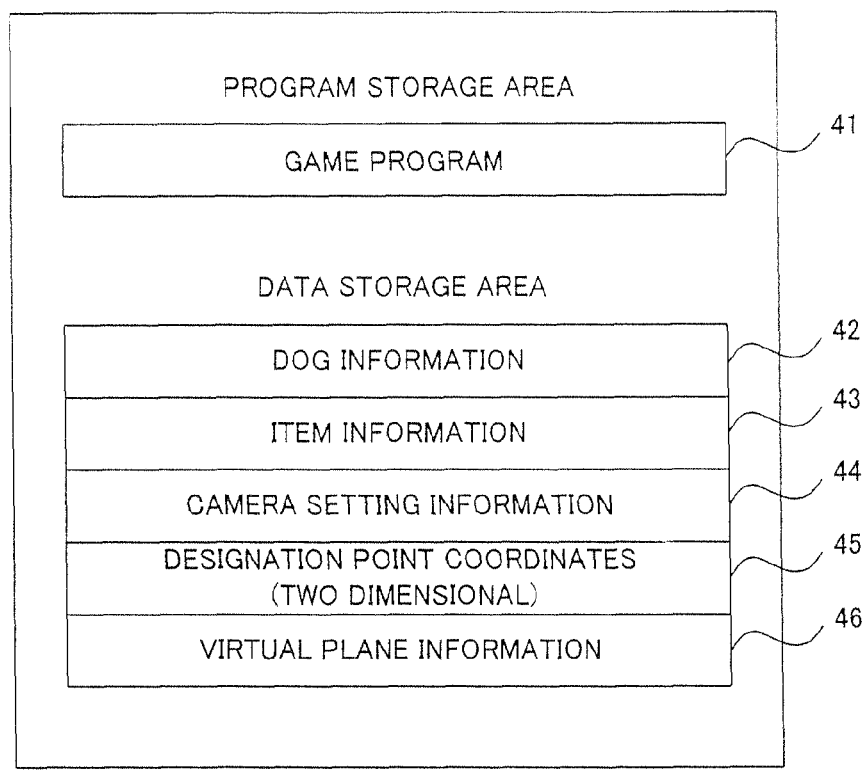
FIG. 3 is a memory map of a RAM 24.
Figure 4:
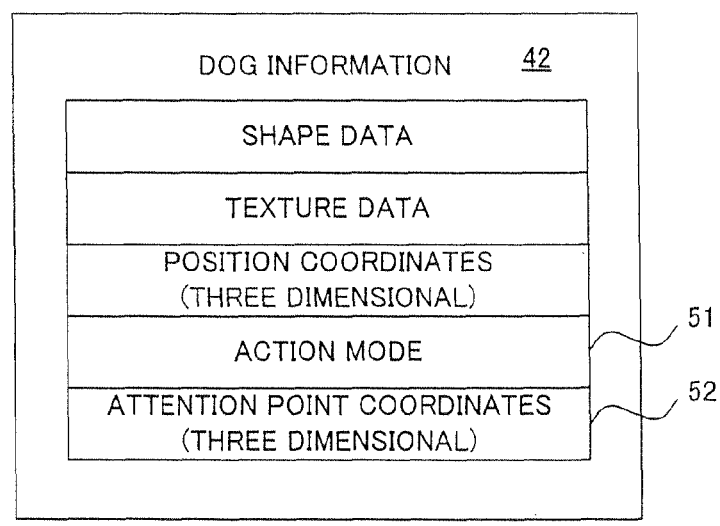
FIG. 4 is a diagram illustrating dog information 42 stored in the RAM 24 in detail.

FIG. 3 illustrates a memory map of the RAM 24. The storage area of the RAM 24 primarily includes a program storage area and a data storage area.

A game program 41 is loaded from the ROM 17a of the memory card 17 to the program storage area.

The data storage area stores dog information 42, item information 43, camera setting information 44, designation point coordinates 45, and virtual plane information 46.

The dog information 42 is various information associated with a dog (more precisely, an object representing the dog) in the virtual three dimensional space, and specifically includes shape data, texture data, position coordinates, an action mode 51, and attention point coordinates 52. In the present embodiment, the dog positioned in the virtual three dimensional space autonomously moves in the virtual three dimensional space as if the dog has its own will, in accordance with a predetermined algorithm.

The shape data is data associated with a shape of an object. An example of such is vertex coordinates of a polygon composing the object. The texture data is image data attached to the polygon composing the object. The position coordinates are position coordinates of the dog in the virtual three dimensional space.

The action mode 51 is a current action mode of the dog. Types of the action mode include six action modes such as a normal mode, an attention mode, a lick mode, a rope shake mode, a bite mode, and a circle mode, as described later. The action mode 51 appropriately changes according to the aforementioned algorithm. For example, when one of items described later, e.g., "a rope", is positioned in the virtual three dimensional space, the dog is automatically controlled to approach the rope to hold an end of the rope with the mouth. Then, when the dog holds the end of the rope with the mouth, the action mode is changed to the rope shake mode.

The attention point coordinates 52 are coordinates indicating a point to which the dog in the virtual three dimensional space pays attention. The attention point coordinates 52 are used when the action mode of the dog is one of the attention mode, the lick mode, the rope shake mode, and the circle mode. Specifically, a position of the head portion of the dog and an angle thereof are controlled such that the dog directs the head to the attention point coordinates 52.

Figure 5:
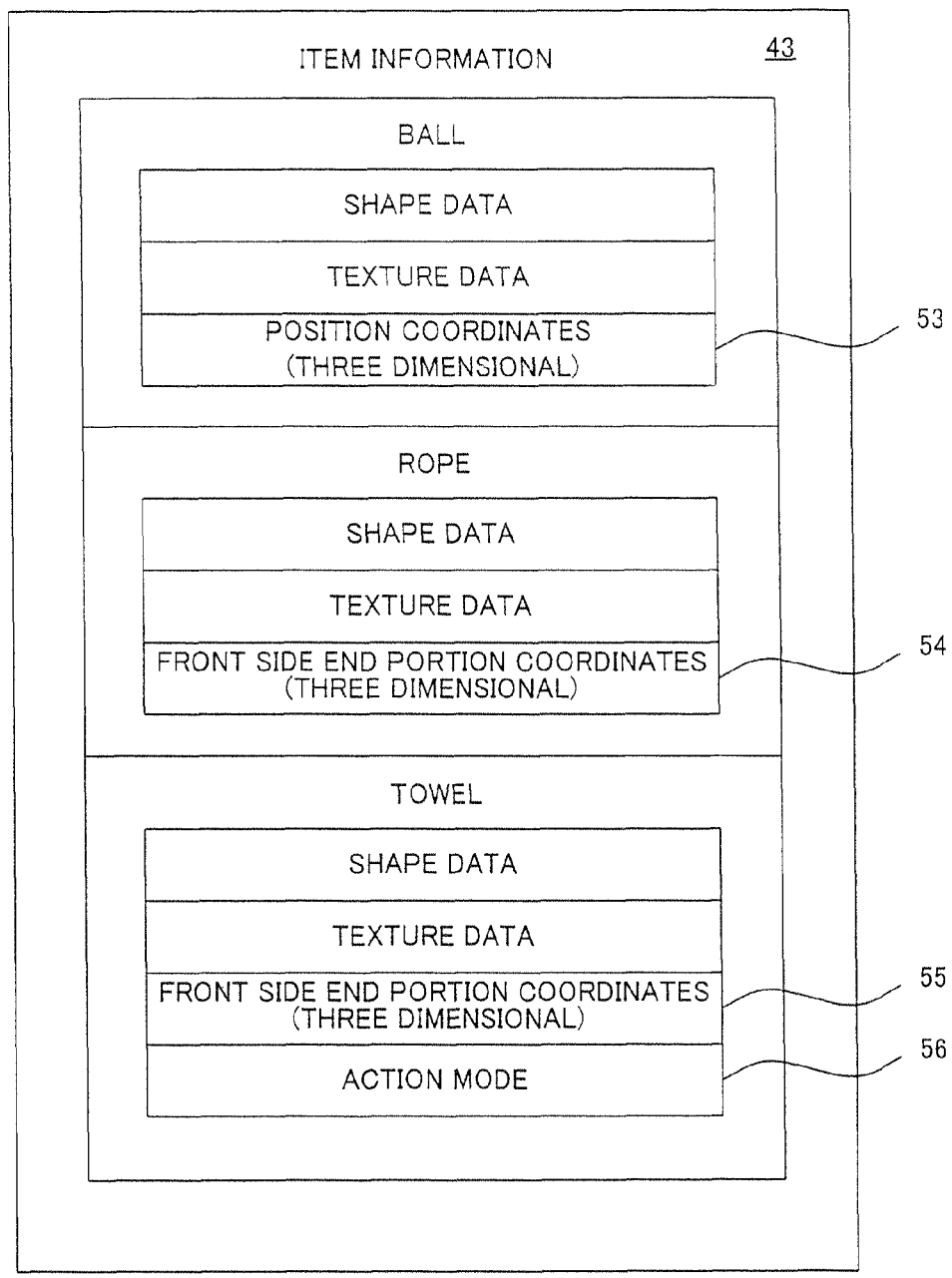
FIG. 5 is a diagram illustrating item information 43 stored in the RAM 24 in detail.

The item information 43 is various information associated with various items positioned in the virtual three dimensional space. In the present embodiment, examples of items positioned in the virtual three dimensional space are a ball, a rope, and a towel, as illustrated in FIG. 5. Information associated with the ball includes shape data, texture data, and position coordinates 53. The position coordinates 53 are position coordinates of the ball in the virtual three dimensional space. Information associated with the rope includes shape data, texture data, and front side end portion coordinates 54. The front side end portion coordinates 54 are position coordinates of an end portion, of two end portions of the rope, displayed such that the end portion appears nearer to a player than the other end portion of the rope in the virtual three dimensional space. Information associated with the towel includes shape data, texture data, front side end portion coordinates 55, and an action mode 56. The front side end portion coordinates 55 are position coordinates of an end portion, of two end portions of the towel, displayed such that the end portion appears nearer to the player than the other end portion of the towel in the virtual three dimensional space.

Figure 6:
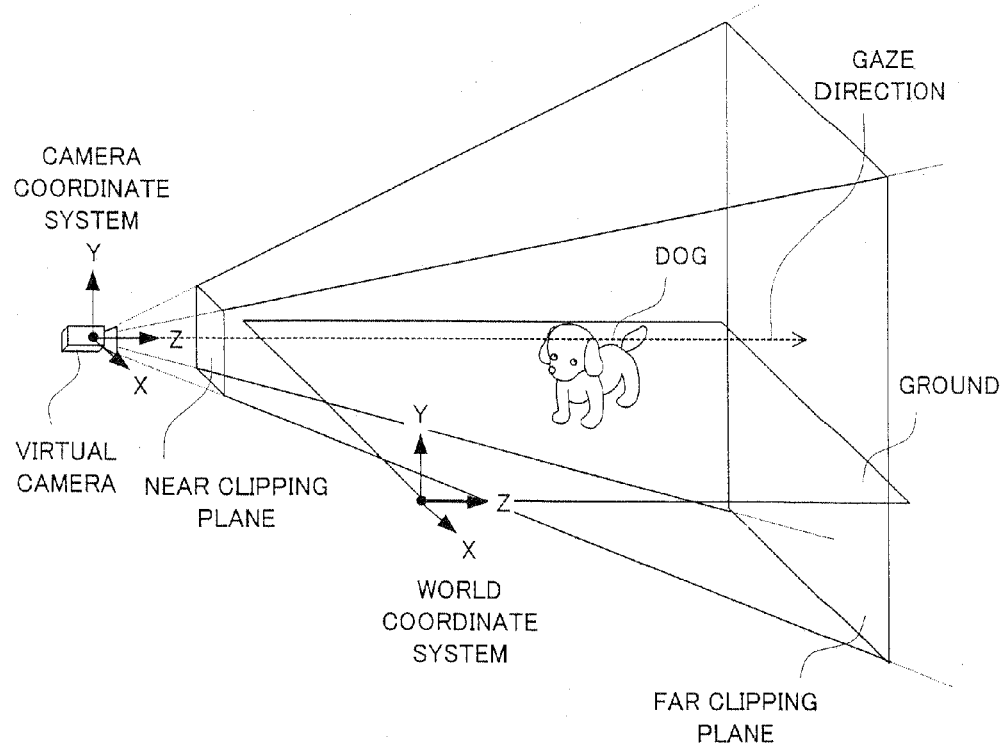
FIG. 6 shows exemplary positions for a virtual camera and an object in a virtual three dimensional space.
Figure 7:
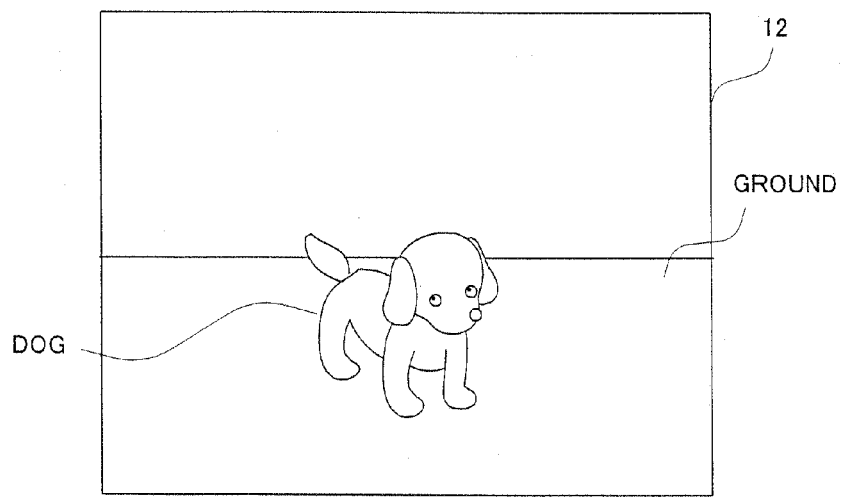
FIG. 7 is an exemplary game screen displayed on a second LCD 12.

The camera setting information 44 is information including various setting values associated with a virtual camera positioned in the virtual three dimensional space. Examples of such are position coordinates, an inclination (rotation angle), a direction (gaze direction), an angle of view, and the like of the virtual camera. FIG. 6 illustrates an exemplary position of the virtual camera in the virtual three dimensional space. On the second LCD 12, displayed is a game image showing a scene, viewed from the virtual camera, on objects such as a dog, an item, and a ground positioned in the virtual three dimensional space. FIG. 7 illustrates a game image displayed on the second LCD 12 by using the virtual camera in FIG. 6. Because a method for generating an image of a virtual three dimensional space using a virtual camera is a well known technique, a detailed description thereof is omitted. However, in a brief description for the method, vertex coordinates of an object (more precisely, vertex coordinates of a polygon composing the object) represented in a world coordinate system are converted to a camera coordinate system based on the virtual camera, and a perspective projection transformation is further performed to convert the converted vertex coordinates into two dimensional coordinates.

The designation point coordinates 45 are coordinates indicating, when the player touches a touch panel 15 with his or her finger or a stick 16, the touched position, and represented in two dimensional coordinates. The designation point coordinates 45 are updated on an as-needed basis by using an output signal from the touch panel 15.

The virtual plane information 46 is information indicating corresponding relationships between a type of an object to be controlled and a virtual plane set in the virtual three dimensional space, and an action mode of an object to be controlled and a virtual plane set in the virtual three dimensional space. The virtual plane is a plane which is virtual and used when the designation point coordinates 45 are converted to a point (control point), in the virtual three dimensional space, used for controlling a movement of the object, and may be a flat surface or a curved surface. Also, the virtual plane may be visible or invisible. A detail for a coordinate conversion, using a virtual flat plane, from the designation point coordinates 45 to a control point is described later.

FIG. 6 illustrates an example of the virtual plane information 46. In this example, when the object to be controlled is a ball or a rope, a first virtual plane (see FIG. 9) is used for a calculation used in the coordinate conversion. Also, the first virtual plane is used when the object to be controlled is a towel and an action mode thereof is a free mode, and a fifth virtual plane is used when the object to be controlled is the towel and the action mode thereof is a bitten mode. A second virtual plane is used when an object to be operated is a dog and an action mode thereof is the attention mode, a third virtual plane is used when the object to be operated is the dog and the action mode thereof is the lick mode, a fourth virtual plane is used when the object to be operated is the dog and the action mode thereof is the rope shake mode, and the fifth virtual plane is used when the object to be operated is the dog and the action mode thereof is the circle mode. Note that, when the object to be operated is a dog and an action mode thereof is a normal mode or a bite mode, a control point is not directly used to control a movement of the dog, and therefore, the coordinate conversion using a virtual plane is unnecessary.

Figure 9:
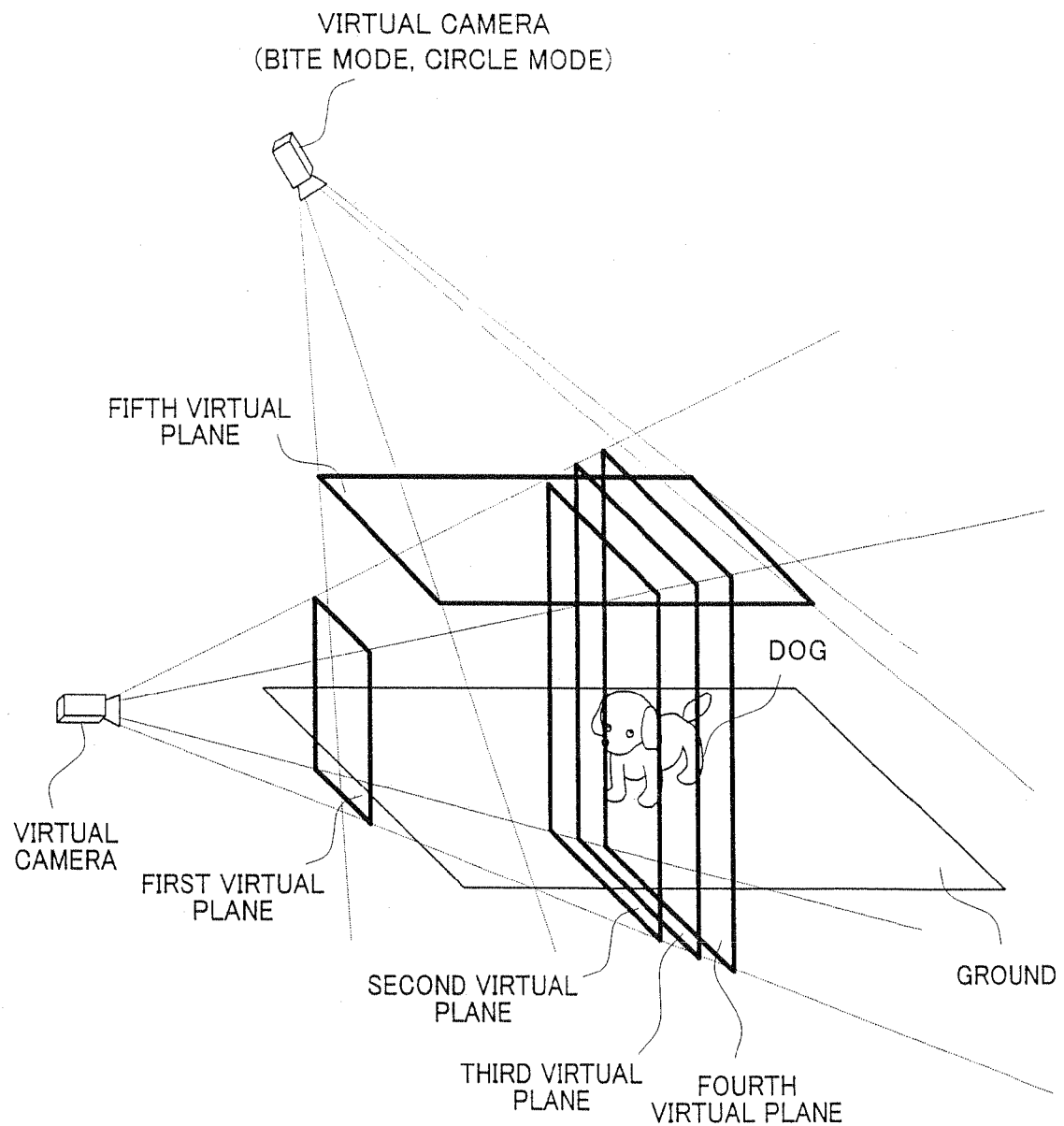
FIG. 9 shows exemplary positions for virtual planes in the virtual three dimensional space.

FIG. 9 illustrates a specific example of each position of the aforementioned first to fifth virtual planes. The first virtual plane is a virtual plane perpendicular to the ground, and the position thereof does not depend on a position of the dog, and is always constant in the virtual three dimensional space. The second, the third, and the fourth virtual planes are virtual planes perpendicular to the ground, and the positions thereof are respectively arranged to positions displaced, by predetermined distances away from the position of the dog and toward the virtual camera. In other words, the positions of these three virtual planes change depending on the position of the dog to be controlled. As FIG. 9 illustrates, among these three virtual planes, the second virtual plane is arranged to a position furthest from the dog and closest to the virtual camera, and the fourth virtual plane is arranged to a position closest to the dog and furthest from the virtual camera. The fifth virtual plane is a virtual plane used either when the action mode of the dog is the bite mode (namely, when the action mode of the towel is the bitten mode), or when the action mode of the dog is the circle mode, and is positioned above the dog, parallel to the ground. The position of the fifth virtual plane does not depend on the position of the dog, and is always constant in the virtual three dimensional space. Note that, when the fifth virtual plane is used (namely, when the action mode of the dog is the bite mode or the circle mode), the position of the virtual camera is temporarily changed to a position overlooking the dog, as illustrated in FIG. 9.

Hereinafter, with reference to FIGS. 10 to 15, an exemplary use of each of the virtual planes, i.e., the first to the fifth virtual planes, is described.

Figure 10:
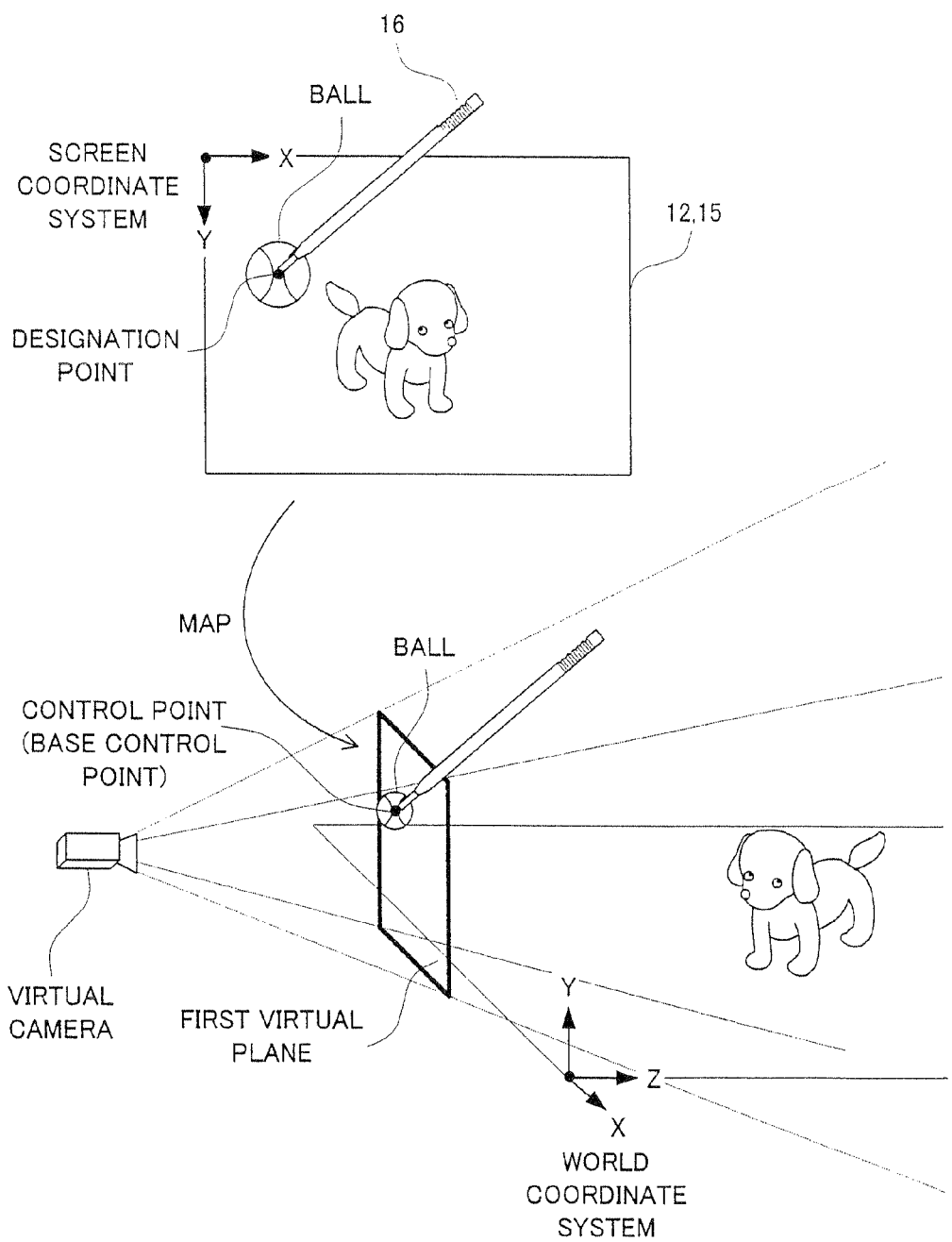
FIG. 10 is a diagram illustrating an exemplary use for a first virtual plane.

FIG. 10 is a diagram illustrating an exemplary use of the first virtual plane. The first virtual plane is a virtual plane used when the player uses, in the virtual three dimensional space, a ball, a rope, or a towel as an item. More specifically, the player evokes an item selection screen by operating an operation switch section 14, selects one among the ball, the rope, and the towel on the evoked item selection screen, and then touches on a desired position on the touch panel 15 with the stick 16 to place the selected item on a point, in the virtual three dimensional space, corresponding to the touched position. FIG. 10 shows an example of a case where the player positions a ball. Each point on the touch panel 15 is respectively associated with a point on the first virtual plane on a one on one basis (namely, a mapping relationship on a one on one basis), and the ball is placed on a position (control point), on the first virtual plane, corresponding to the position touched with the stick 16 (designation point). Then, when the player slides the stick 16 on the touch panel 15, the position of the ball on the first virtual plane accordingly changes. Note that the coordinate conversion from the designation point to the control point may be performed by using mapping data previously prepared, or a calculation using a matrix.

Figure 11:
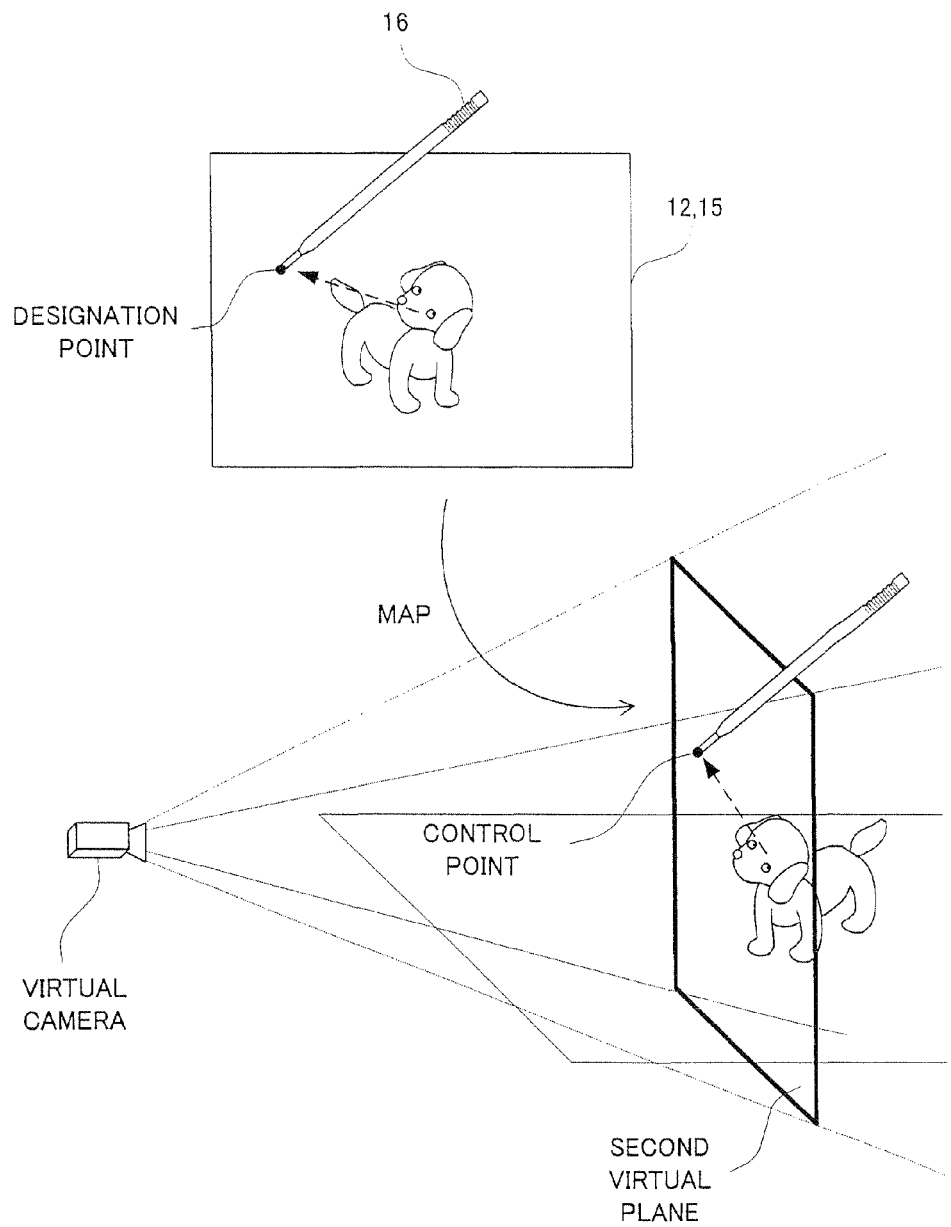
FIG. 11 is a diagram illustrating an exemplary use for a second virtual plane.

FIG. 11 is a diagram illustrating an exemplary use of the second virtual plane. The second virtual plane is a virtual plane used for controlling a movement of the dog when the action mode of the dog is the attention mode. The attention mode is an action mode of the dog when, for example, the dog has a slight interest toward the player, and, in the attention mode, the movement of the dog (particularly the movement of the head portion thereof) is controlled such that the dog looks at the point touched by the player. When the dog has no interest at all toward the player, even when the player touches on the touch panel 15, the dog ignores (the normal mode) the touch, and, when the dog has a tremendous interest toward the player, the dog licks (the lick mode described later) at the point touched by the player. The degree of the interest which the dog has toward the player changes in accordance with various conditions, and the action mode of the dog is updated in accordance with the change.

In the attention mode, when the player touches a desired position on the touch panel 15 with the stick 16 as illustrated in FIG. 11, a point (control point), on the second virtual plane, corresponding to the touched position (designation point) is set as a point to which the dog pays attention. The second virtual plane is similar to the first virtual plane in that each point on the touch panel 15 is associated with a point on the second virtual plane on the one on one basis, and this association relationship further applies to the third to fifth virtual planes. As a result of setting the control point on the second virtual plane as the point to which the dog pays attention, the movement of the dog is controlled such that the dog looks at the control point. Thereafter, when the player slides the stick 16 on the touch panel 15, the dog behaves as if the dog follows the touched position with the eyes.

Figure 12:
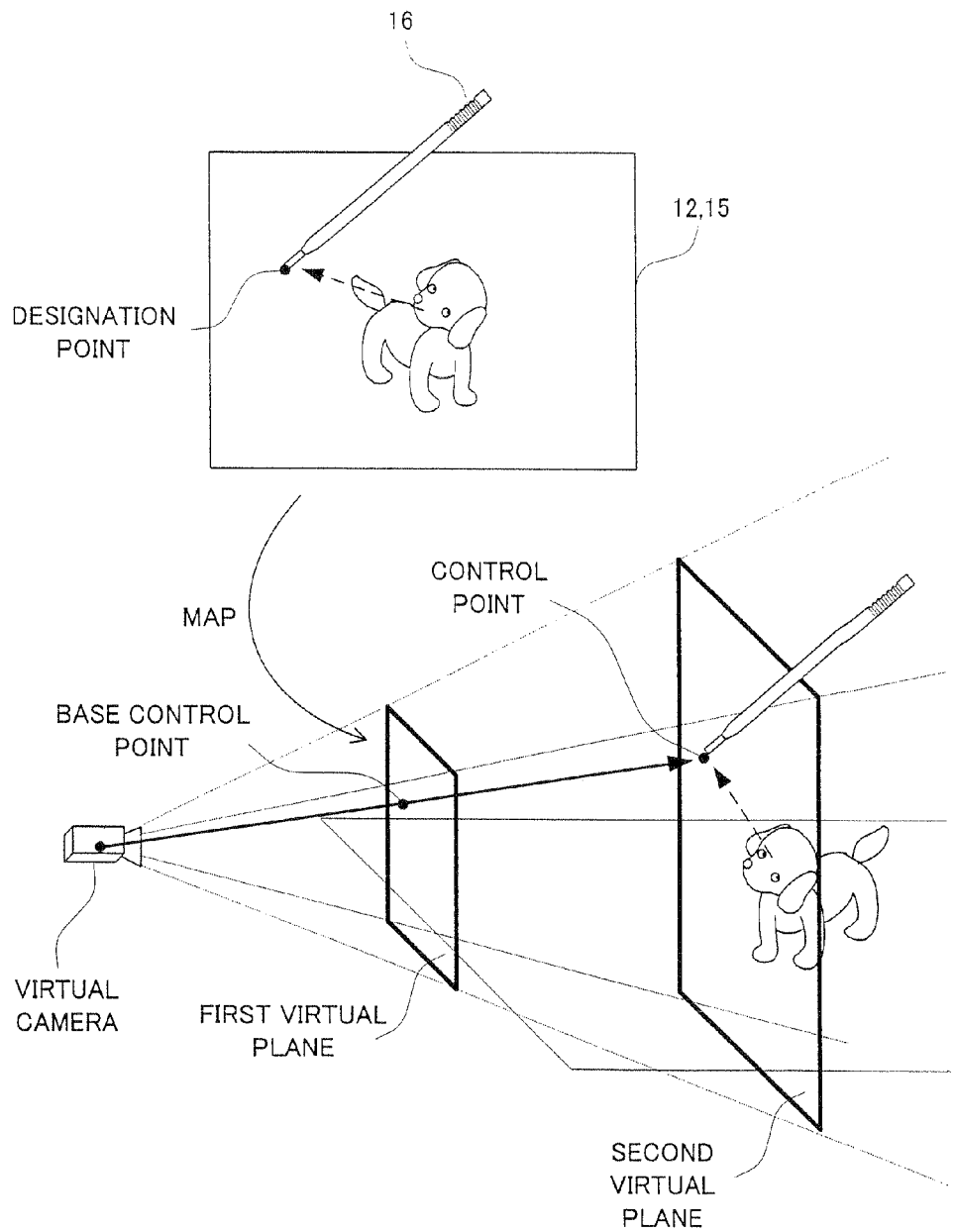
FIG. 12 is a diagram illustrating an example of a conversion method for converting a designation point to a control point.

Note that the coordinate conversion from the designation point to the control point may be performed by using the mapping data previously prepared, or the calculation using the matrix. Also, as illustrated in FIG. 12, a point, on the first virtual plane, corresponding to the designation point may be obtained in a similar manner described using FIG. 10, and then a straight line connecting between the point (hereinafter, refers to as a base control point) and a position of the virtual camera is obtained for calculating an intersection point (the intersection point is a control point on the second virtual plane) between the straight line and the second virtual plane. The same applies to a case where the designation point is converted to a control point on the third virtual plane or the fourth virtual plane. According to such a conversion method, a process converting a base control point into a control point on one of the second to fourth virtual planes can be realized by a simple calculation, and therefore, by, for example, including, in a main routine of the game program 41, a process for converting a designation point into a base control point, when a need for obtaining a control point on one of the second to fourth virtual planes arises, the control point can be easily obtained by using the base control point having already been obtained, thereby simplifying a design of the game program 41. Note that the base control point is not always necessarily set on the first virtual plane, and may be set on a virtual plane other than the first virtual plane. In such a case, a control point on the first virtual plane can be easily obtained by using the base control point.

Figure 13:
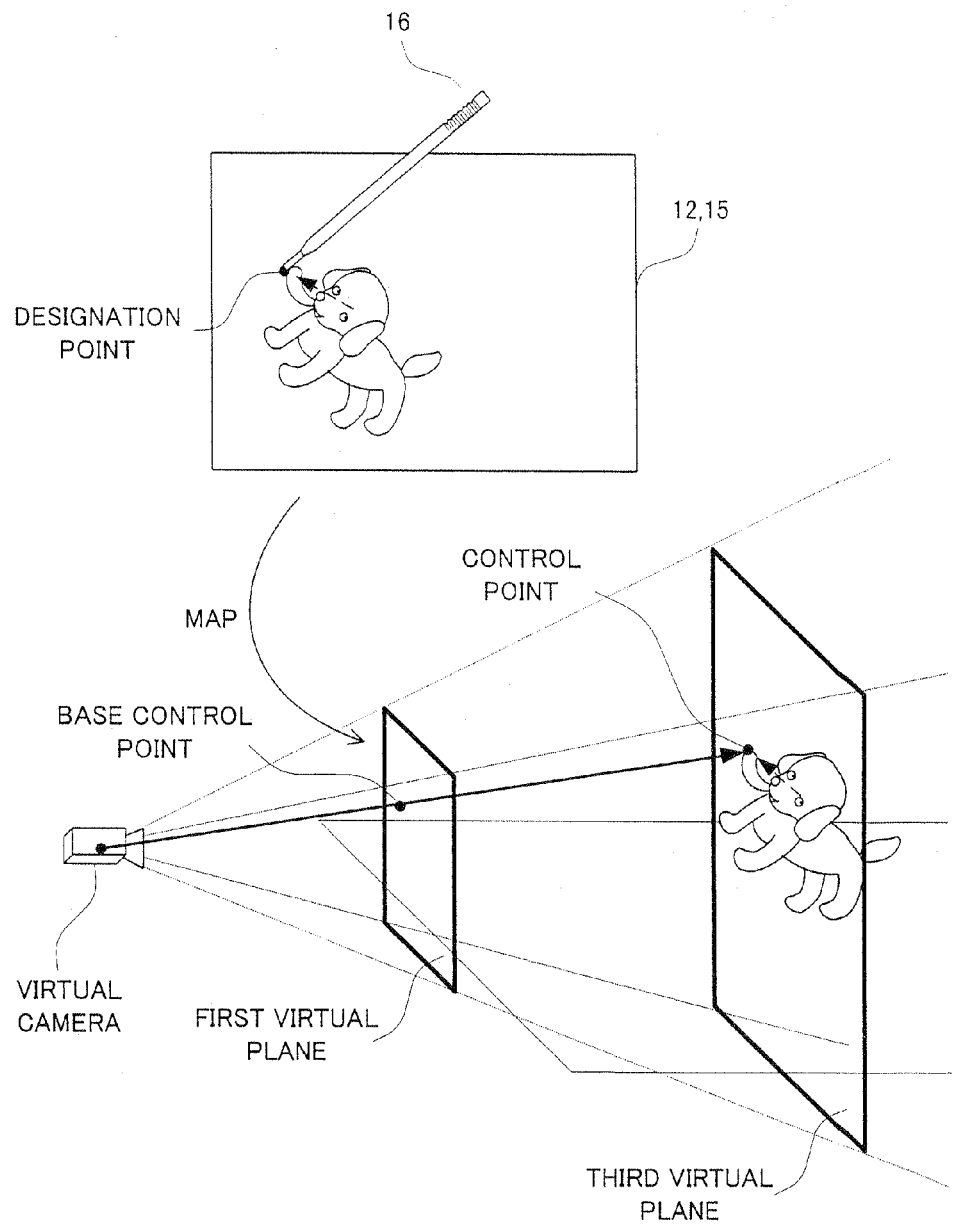
FIG. 13 is a diagram illustrating an exemplary use for a third virtual plane.

FIG. 13 is a diagram illustrating an exemplary use of the third virtual plane. The third virtual plane is a virtual plane used for controlling the movement of the dog when the action mode of the dog is the lick mode. The lick mode is an action mode of the dog when the dog has a tremendous interest toward the player, and, in the lick mode, the movement of the dog (particularly the movement of the head portion thereof) is controlled such that the dog licks at the point touched by the player with the tongue. The reason for the position of the virtual plane used in the attention mode being set further away from the dog compared to the position thereof used in the lick mode is that the behavior of the dog displayed on the second LCD 12 seems more natural when so set. For example, if the position of the virtual plane used in the attention mode is set on the same position thereof used in the lick mode, the dog appears, to the player, to be looking at a direction slightly deviated from that of the touched position, and therefore, it seems unnatural.

Figure 14:
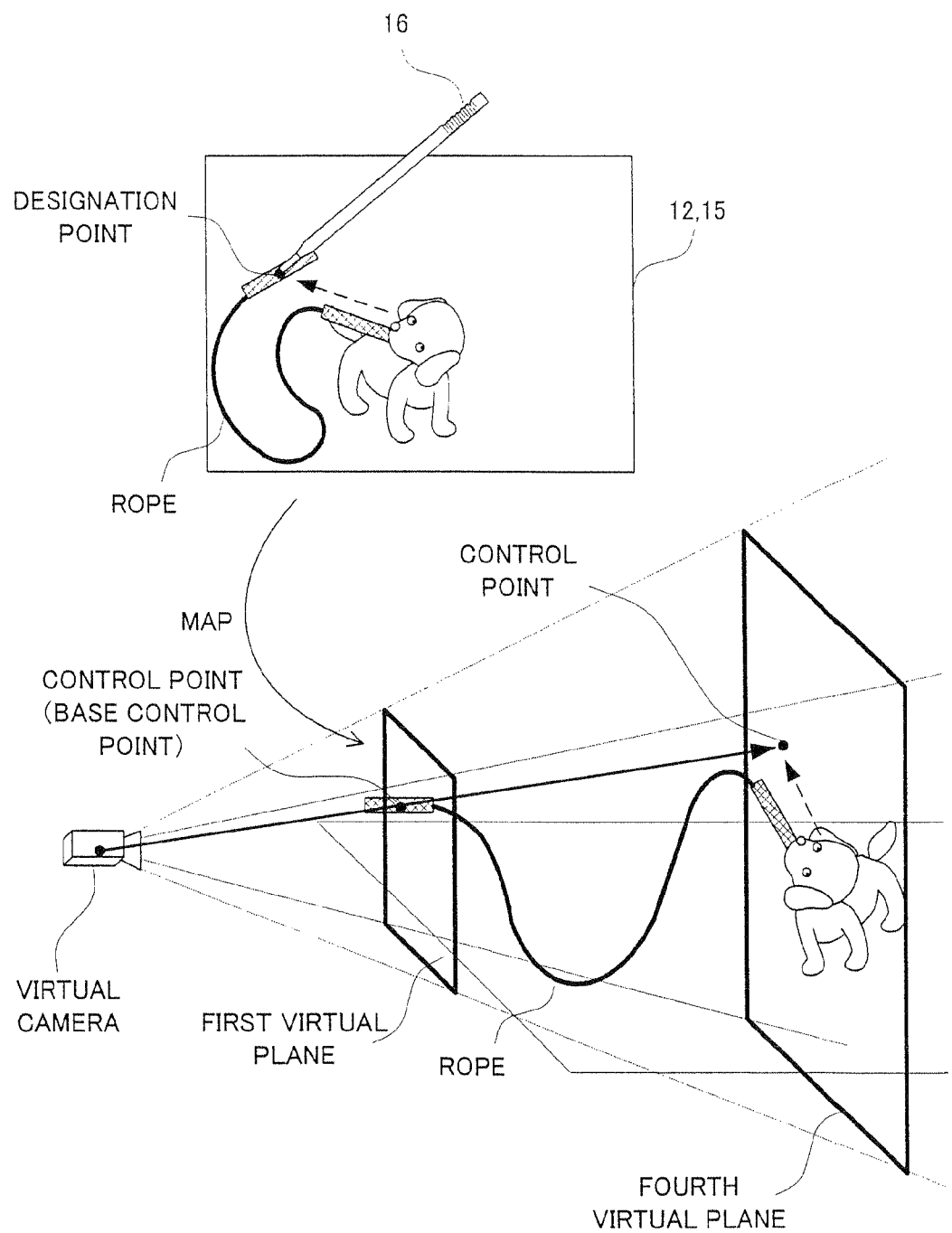
FIG. 14 is a diagram illustrating an exemplary use for a fourth virtual plane.

FIG. 14 is a diagram illustrating an exemplary use of the fourth virtual plane. The fourth virtual plane is a virtual plane used for controlling the movement of the dog when the action mode of the dog is the rope shake mode. The rope shake mode is an action mode of the dog when the dog holds, with the mouth, an end (back side end portion) of a rope positioned in the virtual three dimensional space by the player. Here, the back side end portion means, of two end portions of the rope, an end portion displayed such that the end portion appears further away from the player than the other end portion of the rope in the virtual three dimensional space. In the rope shake mode, a control point, on the fourth virtual plane, corresponding to the designation point is set as a point to which the dog pays attention. On the other hand, a front side end portion of the rope is positioned, in a similar manner described using FIG. 10, at a control point, on the first virtual plane, corresponding to the designation point. Also, as for a center portion of the rope, coordinates thereof are updated so that the center portion follows a movement of the end portions of the rope to move like a real rope. Consequently, when the player circularly slides the stick 16 on the touch panel 15, the front side end portion of the rope displayed on the touched position and the head portion of the dog holding, with the mouth, the back side end portion of the rope move in connection with the movement of the stick 16, thereby providing a sense to the player that the player turns the rope together with the dog. The reason for the position of the fourth virtual plane being closer to the dog than the positions of the second and third virtual planes is to allow the back side end portion of the rope to extensively move. If the back side end portion of the rope extensively moves, the center portion of the rope is easily moved, whereby the rope is easily turned.

Figure 15:
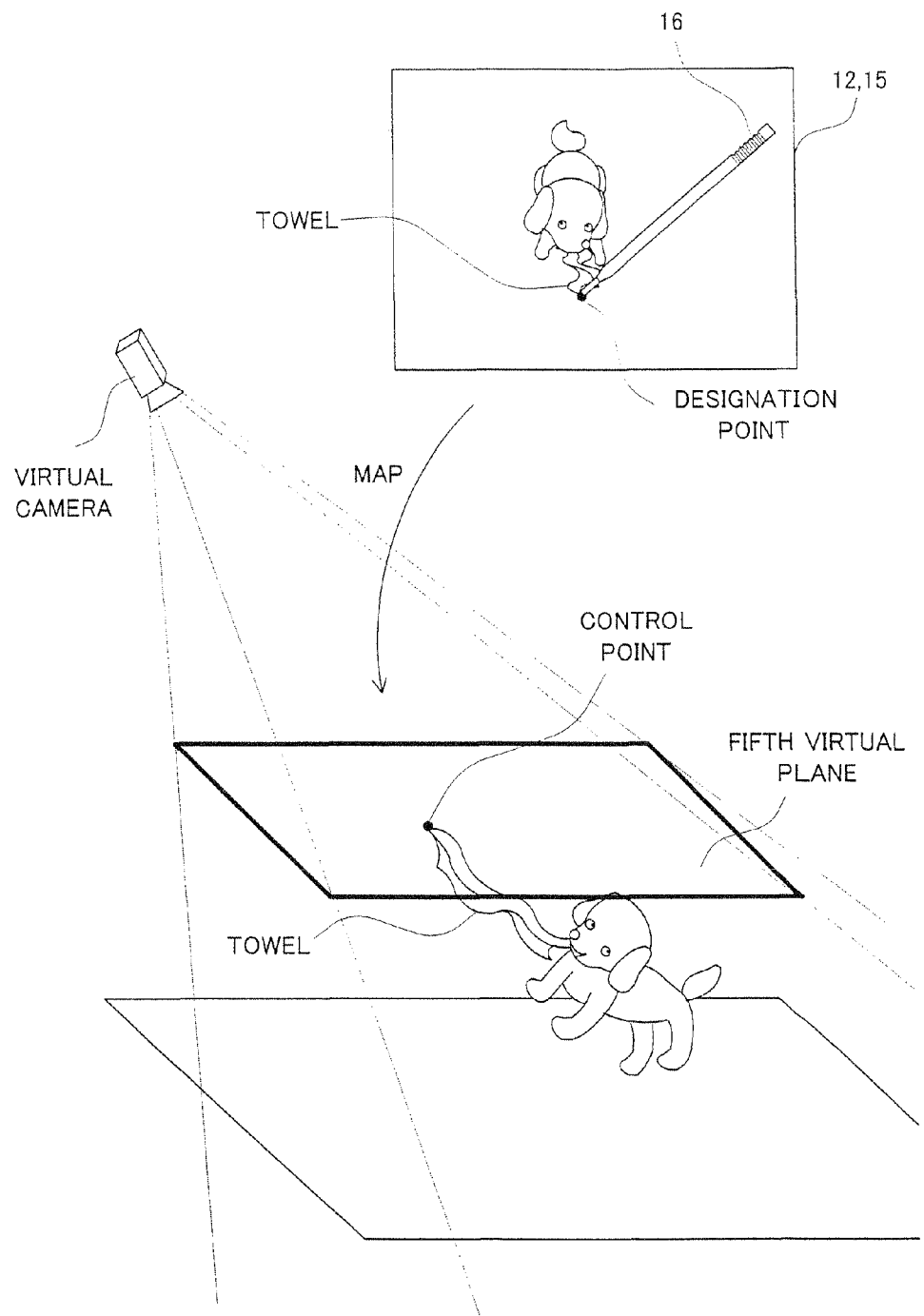
FIG. 15 is a diagram illustrating an exemplary use for a fifth virtual plane.

FIG. 15 is a diagram illustrating an exemplary use of the fifth virtual plane. The fifth virtual plane is a virtual plane used when the player positions, in a similar manner described using FIG. 10, one end of a towel on the first virtual plane in the virtual three dimensional space, and then the dog holds, with the mouth, another end of the towel (namely, when the action mode of the towel is the bitten mode). Also, the fifth virtual plane is used when the player evokes a mode selection screen by operating the operation switch section 14, and selects the circle mode on the mode selection screen. In the bitten mode, the designation point is converted to a control point on the fifth virtual plane, and the front side end portion of the towel is positioned on the control point. The towel is caused to move by the player sliding the stick 16 on the touch panel 15, and because the back side end portion of the towel is bitten by the dog, the movement of the towel also causes the dog to move as if the dog is pulled by the towel. Also, in the circle mode, the designation point is converted to a control point on the fifth virtual plane, the control point is set as a point to which the dog pays attention, and the dog is controlled to move such that the dog directs the face and the body to a direction of the attended point. As a result, when the player circularly slides the stick 16 on the touch panel 15, the dog follows the touched position, whereby the dog turns (namely, in circles).

Hereinafter, with reference to flowcharts in FIGS. 16 to 20, a flow of a process of the CPU core 21 according to the game program 41 is described.

Figure 16:
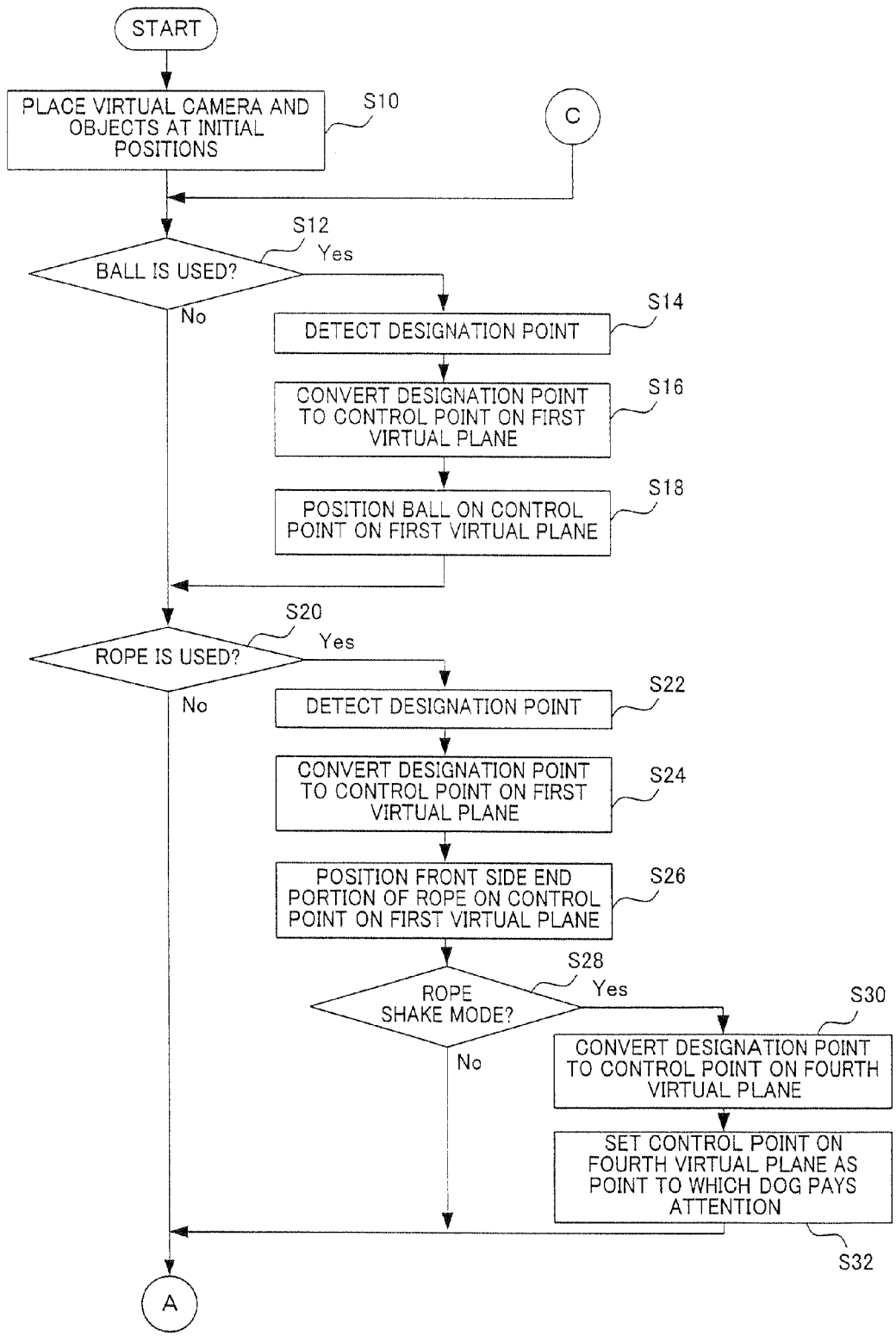
FIG. 16 is a portion of a flowchart illustrating an operation of the game apparatus.

In FIG. 16, when a game is started, the CPU core 21 firstly places, in step S10, the virtual camera and the objects (the dog and the ground) in the virtual three dimensional space at their initial positions.

In step S12, whether the ball is used by the player (namely, a state shown in FIG. 10) is determined. If the ball is used, the process proceeds to step S14, and, if the ball is not used, the process proceeds to step S20. In the flowcharts of FIGS. 16 to 20, steps such as the player evoking the item selection screen to select an item and evoking the mode selection screen to select, for example, the circle mode are omitted.

In step S14, the designation point is detected by using an output signal from the touch panel 15, and stored in the RAM 24 as the designation point coordinates in FIG. 3.

In step S16, the designation point detected in step S14 is converted to a control point on the first virtual plane with the aforementioned method.

In step S18, the ball is positioned on the control point, on the first virtual plane, obtained in step S16. More specifically, the control point obtained in step S16 is stored in the RAM 24 as the position coordinates 53 in FIG. 5. The position coordinates 53 are referred when a game image is generated in later described step S72 of FIG. 18. Consequently, the ball is displayed on the second LCD 12 as shown in FIG. 10.

In step S20, whether the rope is used by the player is determined. If the rope is used, the process proceeds to step S22, and, if the rope is not used, the process proceeds to step S34 of FIG. 17.

Steps S22 and S24 are the same as aforementioned steps S14 and S16, respectively.

In step S26, the front side end portion of the rope is positioned on the control point, on the first virtual plane, obtained in step S24. More specifically, the control point obtained in step S24 is stored in the RAM 24 as the front side end portion coordinates 54 of the rope. The front side end portion coordinates 54 are used when a game image is generated in later described step S72 of FIG. 18.

In step S28, the action mode 51 included in the dog information 42 in the RAM 24 is referred to determine whether the action mode of the dog is the rope shake mode. If it is the rope shake mode, the process proceeds to step S30, and, if it is not the rope shake mode, the process proceeds to step S34 of FIG. 17.

In step S30, the designation point detected in step S22 is converted to a control point on the fourth virtual plane with the aforementioned method.

In step S32, the control point, on the fourth virtual plane, obtained in step S30 is set as a point to which the dog pays attention. More specifically, the control point obtained in step S30 is stored in the RAM 24 as the attention point coordinates 52 of the dog. The attention point coordinates 52 are used when a movement of the dog is automatically controlled in later described step S66 of FIG. 18.

Figure 17:
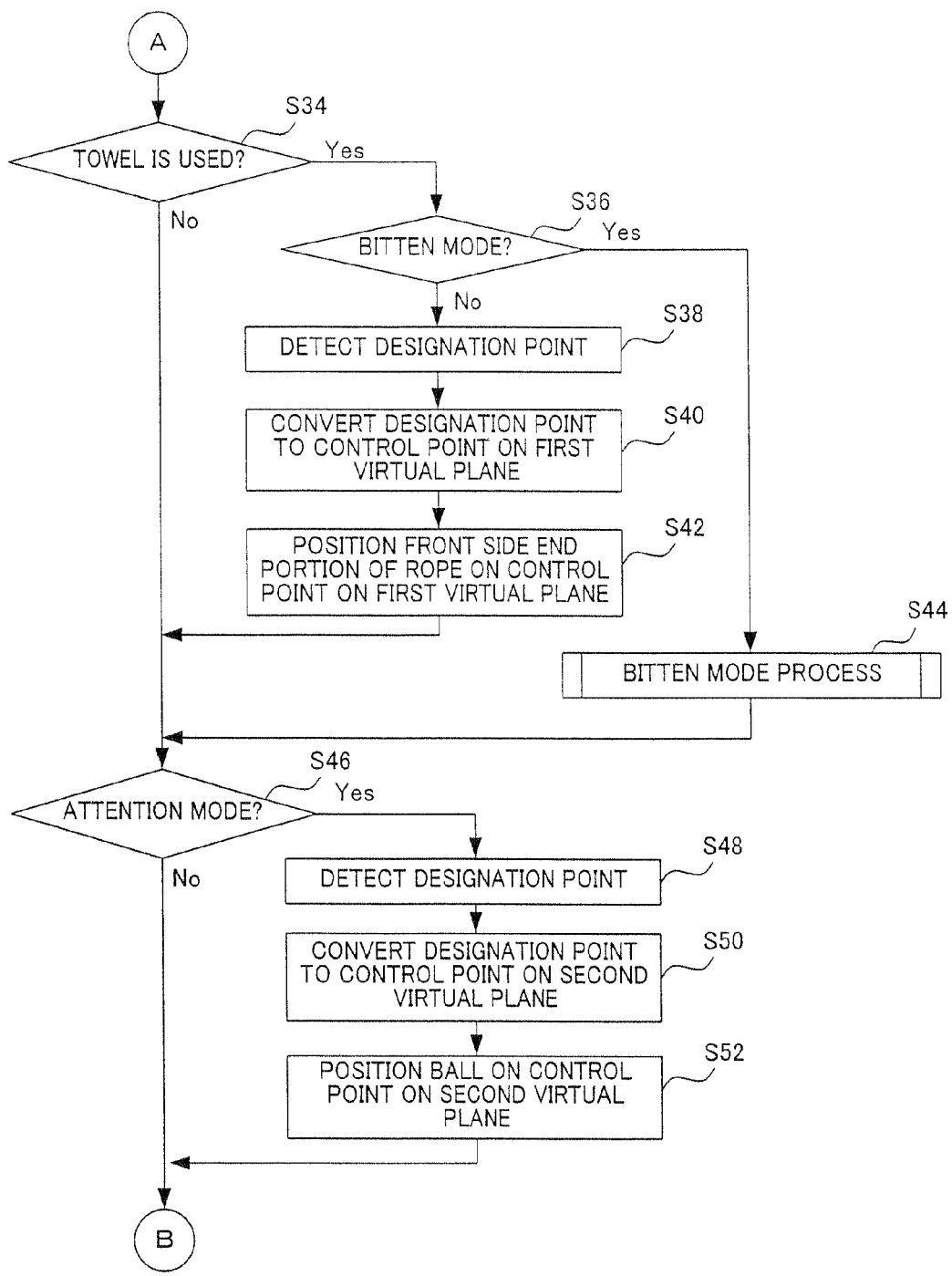
FIG. 17 is another portion of the flowchart illustrating the operation of the game apparatus.

In step S34 of FIG. 17, whether the towel is used by the player is determined. If the towel is used, the process proceeds to step S36, and, if the towel is not used, the process proceeds to step S46.

In step S36, whether the back side end portion of the towel is bitten (namely, the bitten mode) by the dog is determined. If it is not the bitten mode, the process proceeds to step S38, and, if it is the bitten mode, the process proceeds to step S44.

Steps S38 to S40 are the same as the aforementioned steps S14 and S16, respectively.

In step S42, the front side end portion of the towel is positioned on the control point, on the first virtual plane, obtained in step S40. More specifically, the control point obtained in step S40 is stored in the RAM 24 as the front side end portion coordinates 55 of the towel. The front side end portion coordinates 55 are used when a game image is generated in later described step S72 of FIG. 18.

In step S44, a bitten mode process is executed. A detail for the bitten mode process is described later.

In step S46, the action mode 51 included in the dog information 42 in the RAM 24 is referred to determine whether the action mode of the dog is the attention mode. If it is the attention mode, the process proceeds to step S48, and, if it is not the attention mode, the process proceeds to step S54 of FIG. 18.

Step S48 is the same as the aforementioned step S14.

In step S50, the designation point detected in step S48 is converted to a control point on the second virtual plane with the aforementioned method. However, in a case where the player has not touched the touch panel 15 (namely, if a designation point is not detected in step S48), steps S50 and S52 are skipped.

In step S52, the control point, on the second virtual plane, obtained in step S50 is set as a point to which the dog pays attention.

Figure 18:
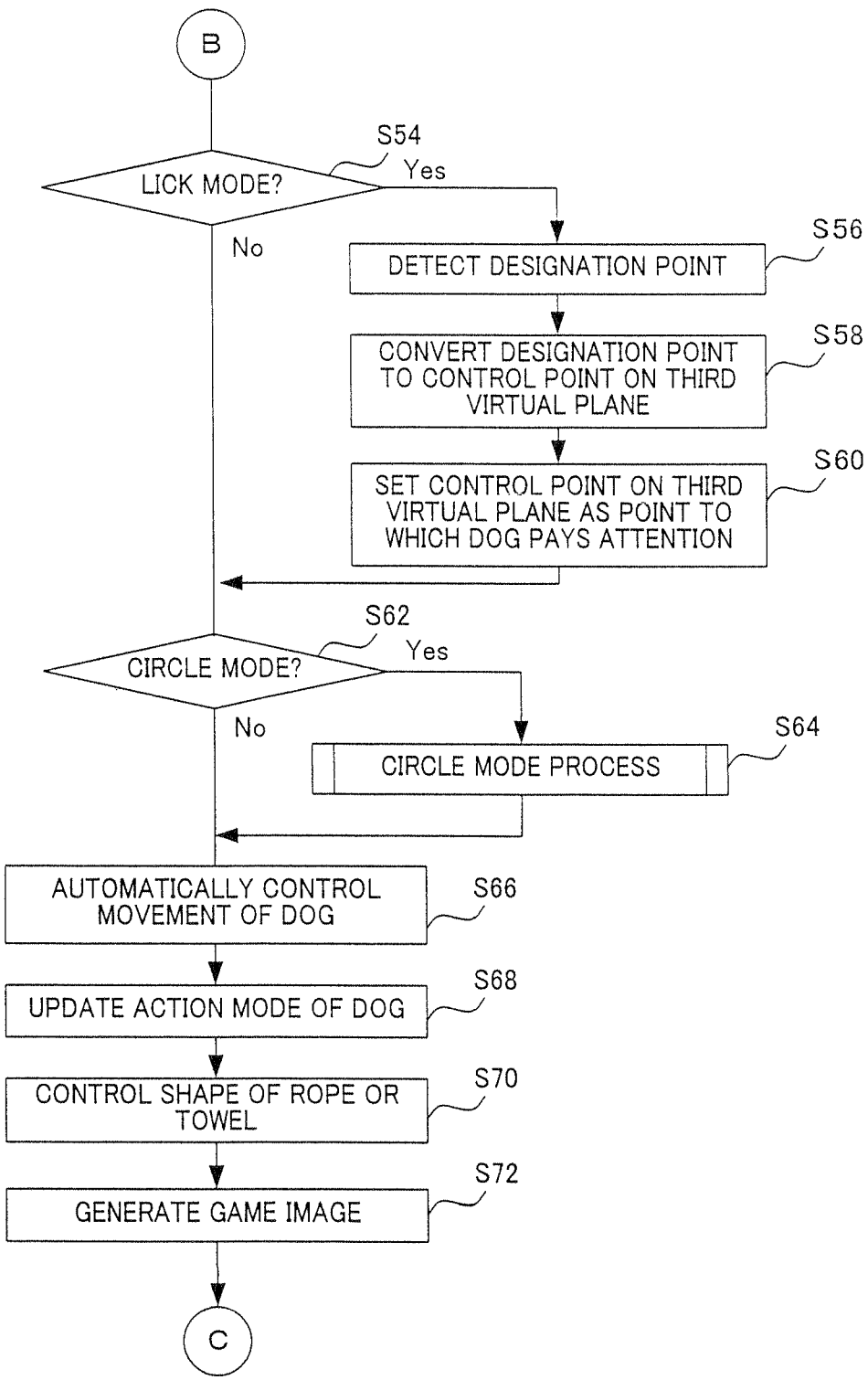
FIG. 18 is still another portion of the flowchart illustrating the operation of the game apparatus.

In step S54 of FIG. 18, the action mode 51 included in the dog information 42 in the RAM 24 is referred to determine whether the action mode of the dog is the lick mode. If it is the lick mode, the process proceeds to step S56, and, if it is not the lick mode, the process proceeds to step S62.

Step S56 is the same as the aforementioned step S14.

In step S58, the designation point detected in step S56 is converted to a control point on the third virtual plane with the aforementioned method. However, in a case where the player has not touched the touch panel 15 (namely, if a designation point is not detected in step S56), steps S58 and S60 are skipped.

In step S60, the control point, on the third virtual plane, obtained in step S58 is set as a point to which the dog pays attention.

In step S62, whether the circle mode is selected by the player is determined. If the circle mode is selected, the process proceeds to step S64, and, if the circle mode is not selected, the process proceeds to step S66.

In step S64, a circle mode process is executed. A detail for the circle mode process is described later.

In step S66, the attention point coordinates 52 included in the dog information 42 in the RAM 24 are appropriately referred to automatically control the movement of the dog by using a predetermined automatic control algorithm. More specifically, the position coordinates of the dog and coordinates for each portion of the dog are updated.

In step S68, the action mode of the dog is changed, as necessary, in accordance with the result of the automatic control in step S66, and the action mode 51 included in the dog information 42 in the RAM 24 is updated.

In step S70, the front side end portion coordinates 54 of the rope or the front side end portion coordinates 55 of the towel included in the item information 43 in the RAM 24 is referred to control a movement of the rope or the towel (namely, to calculate the position coordinates and coordinates of each portion of the rope or the towel). In a case where the action mode of the dog is the rope shake mode or the bite mode, the shape of the rope or the towel is controlled depending also on the movement of the dog controlled in step S66. If neither the rope or the towel is used, step S70 is skipped.

In step S72, based on the results obtained in steps S66 and S70 and the camera setting information 44 in the RAM 24, a game image showing a state of the virtual three dimensional space being viewed from the virtual camera is generated and stored in a frame buffer (not shown), and then, the process returns to step S12. The game image generated as above is outputted to the second LCD 12 with an appropriate timing.

Figure 19:
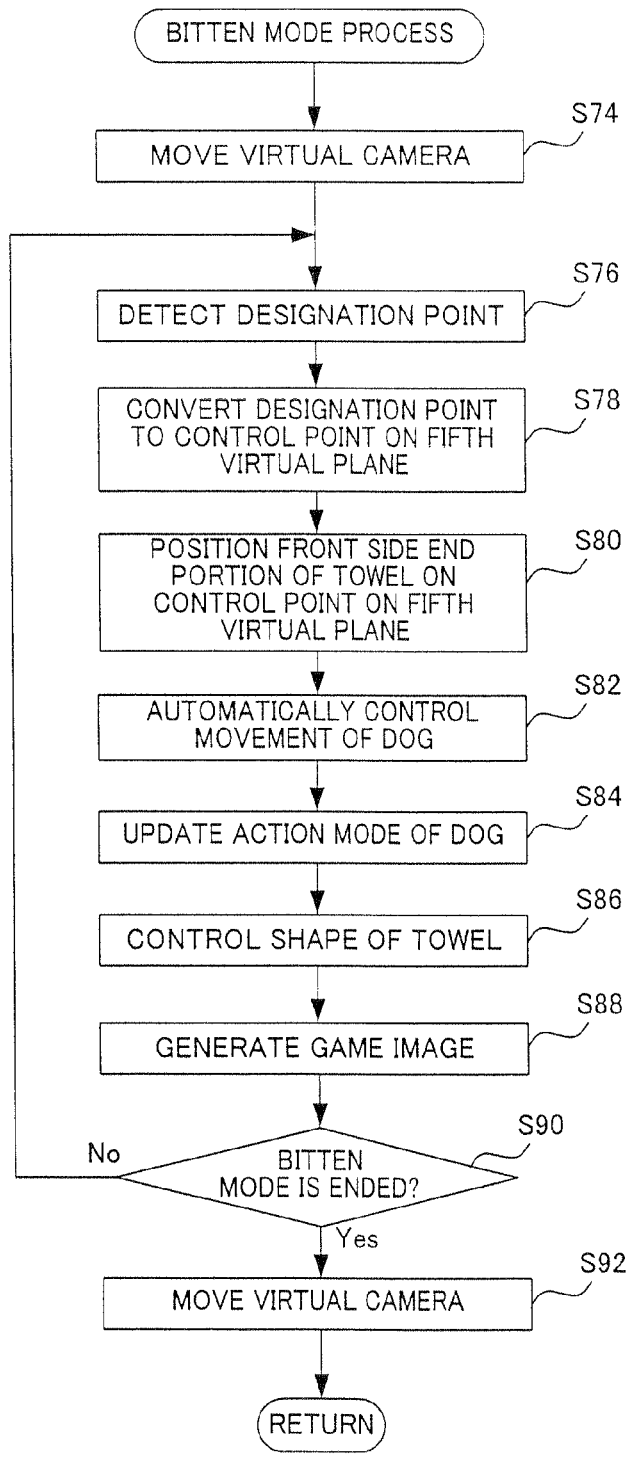
FIG. 19 is a flowchart illustrating a bitten mode process in detail.

Next, with reference to FIG. 19, described is a detail for the bitten mode process when the dog holds, with the mouth, the back side end portion of the towel used by the player.

In the bitten mode process, the CPU core 21 firstly moves, in step S74, the virtual camera to a position overlooking the dog as illustrated in FIG. 9. Specifically, this is performed by changing the camera setting information 44 in the RAM 24.

Step S76 is the same as the aforementioned step S14.

In step S78, the designation point detected in step S76 is converted to a control point on the fifth virtual plane with the aforementioned method.

In step S80, the front side end portion of the towel is positioned on the control point, on the fifth virtual plane, obtained in step S78. More specifically, the control point obtained in step S78 is stored in the RAM 24 as the front side end portion coordinates 55 of the towel.

Steps S82 to S88 are substantially the same as the aforementioned steps S66 to S72.

In step S90, whether the bitten mode is ended is determined. A time at which the bitten mode is ended is when, for example, the player has detached the stick 16 from the touch panel 15, and therefore, the front side end portion of the towel is freed from the fifth virtual plane thereby being allowed to freely move, or when the dog releases the towel. If the bitten mode is not ended, the process returns to step S76, and, if the bitten mode is ended, the process proceeds to step S92.

In step S92, by setting the camera setting information 44 changed in step S74 back to the original, the virtual camera is returned to the original position, and then, the bitten mode process is ended.

Figure 20:
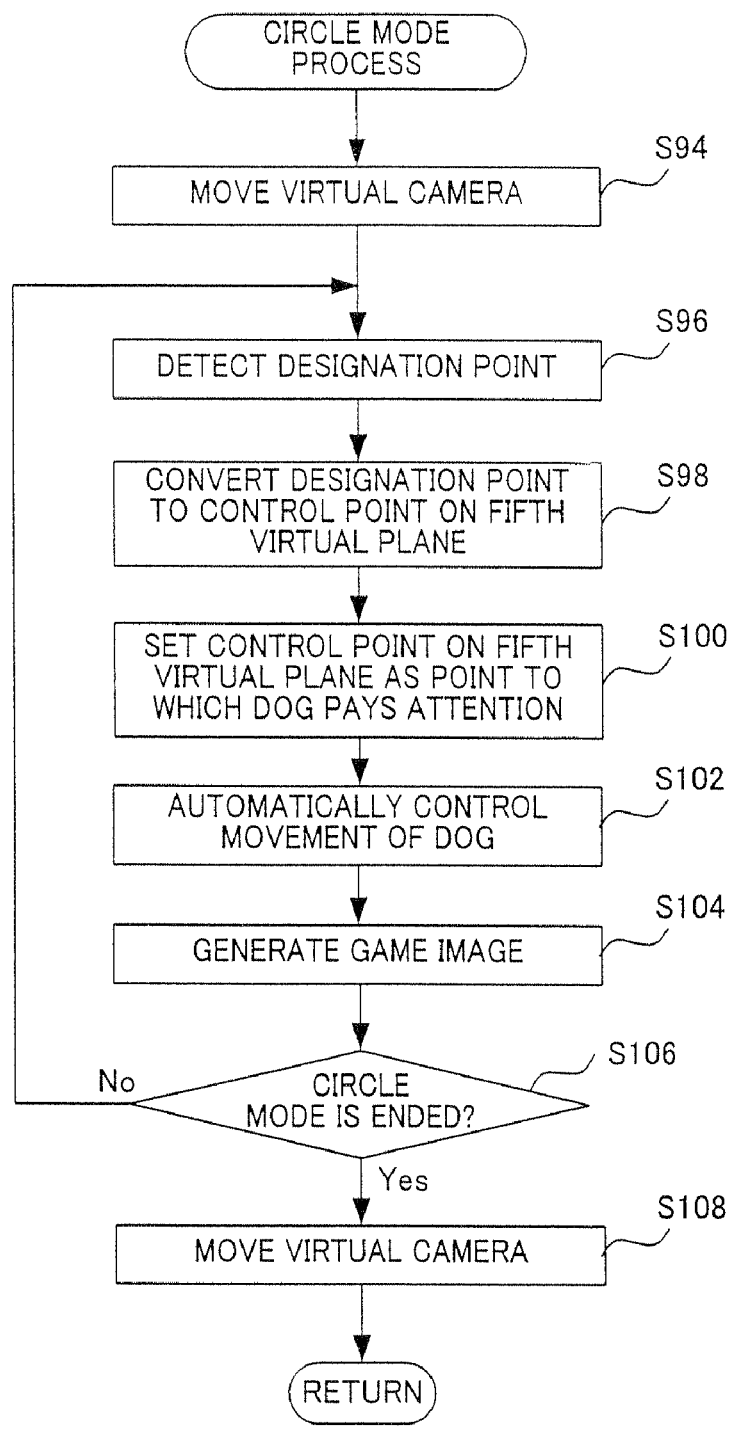
FIG. 20 is a flow chart illustrating a circle mode process in detail.

Next, with reference to FIG. 20, a detail for the circle mode process is described.

Steps S94 to S98 are the same as the aforementioned steps S74 to S78.

In step S100, the control point, on the fifth virtual plane, obtained in step S98 is set as a point to which the dog pays attention.

Steps S102 and S104 are the same as the aforementioned steps S66 and S72, respectively.

In step S106, whether the circle mode is ended is determined. A time at which the circle mode is ended is when, for example, the player evokes the mode selection screen by operating the operation switch section 14, and instructs to end the circle mode on the mode selection screen. If the circle mode is not ended, the process returns to step S96, and, if the circle mode is ended, the process proceeds to step S108.

In step S108, by setting the camera setting information 44 changed in step S94 back to the original, the virtual camera is returned to the original position, and the circle mode process is ended.

As described above, according to the present embodiment, a designation point, on a display screen, designated by a player using a pointing device is not constantly assigned to a control point on a same virtual plane, but the designation point is converted, according to a use of the control point, to a control point on a different virtual plane depending on a condition, e.g., when the player desires a dog to turn a rope, the designation point is converted to a control point on the fourth virtual plane, whereby a movement of an object can be easily and appropriately controlled without the player having a trouble of designating a position for the control point along a depth direction.

Also, as in FIG. 14, a common designation point is converted to at least two control points, and, by using these two control points, a plurality of objects can thereby be simultaneously and synchronously operated.

Figure 21:
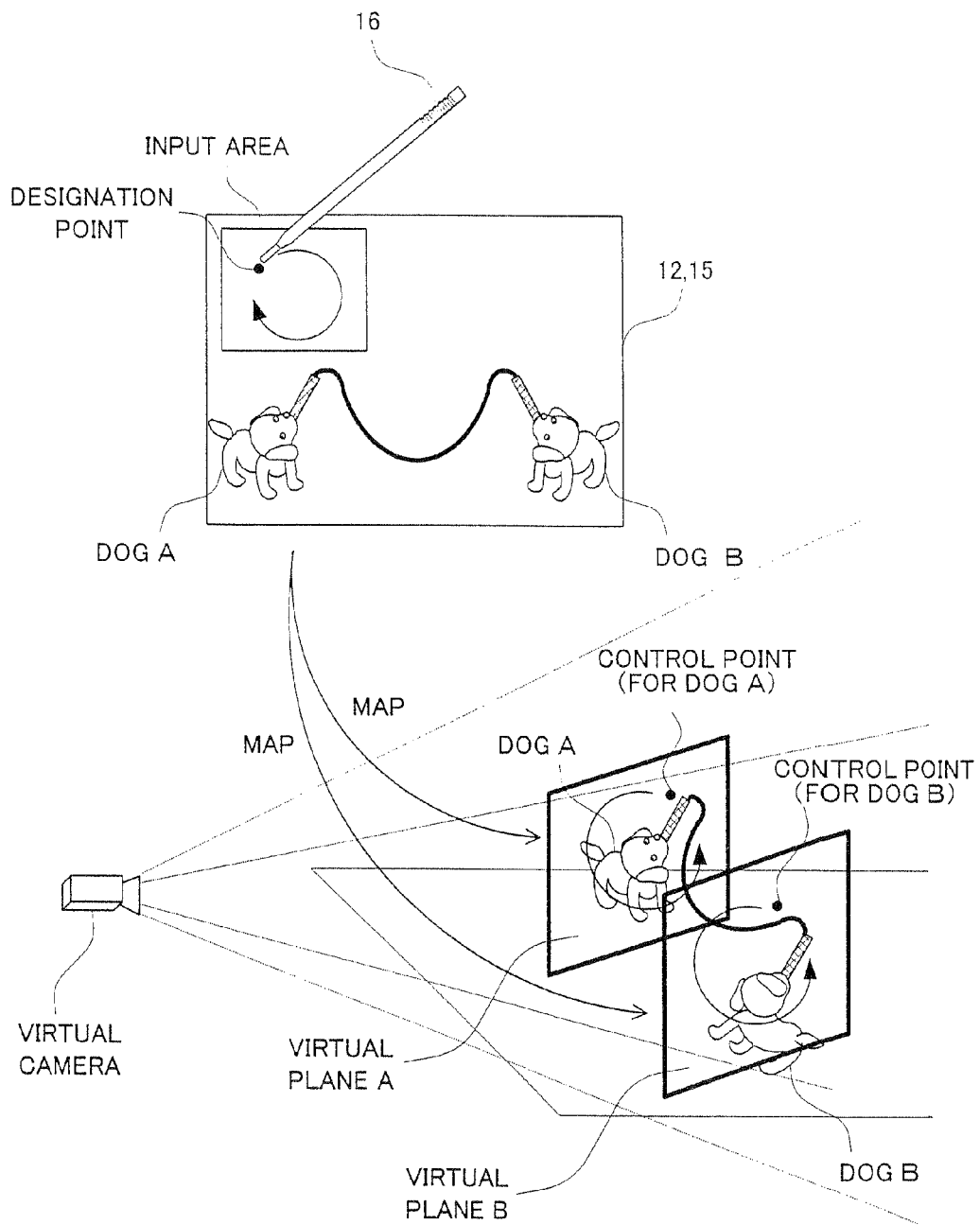
FIG. 21 is a diagram illustrating another exemplary embodiment.

In another embodiment, an exemplary case, shown in FIG. 21, where, although a common designation point is converted to at least two control points, these two control points are not always displayed, on a display screen, on the same position as that of the designation point. In the example shown in FIG. 21, a predetermined input area is provided on the touch panel 15, and, in a virtual three dimensional space, two virtual planes, A and B, having a one on one mapping relationship with the input area are provided. The virtual plane A is a virtual plane on which a control point for controlling a movement of a dog A is set, and the virtual plane B is a virtual plane on which a control point for controlling a movement of a dog B is set. Specifically, the control point on the virtual plane A is used as a point to which the dog A pays attention, and the control point on the virtual plane B is used as a point to which the dog B pays attention. One end of a single rope is held by one of the dogs A and B with the mouth, and the other end thereof is held by one of the other dogs A and B with the mouse. When a player slides the stick 16 in the predetermined input area on the touch panel 15, the dogs A and B roll their heads in connection with the movement of the stick 16, allowing the rope to be nicely turned. In this example, although the at least two control points converted from the designation point are not always displayed, on the display screen, on the same position as that of the designation point, through converting the common designation point to at least two control points, and controlling objects in the virtual three dimensional space by using these two control points, the player can easily perform a complex operation. In the example shown in FIG. 21, the input area is a portion of the area on the touch panel 15, but the input area may be a whole area of the touch panel 15 as in the aforementioned embodiment.

While exemplary embodiments have been described in detail, the foregoing description is in all aspects illustrative and not restrictive. It is understood that numerous other modifications and variations can be devised without departing from the scope of the exemplary embodiment.

The invention claimed is:

1. A non-transitory computer readable storage medium storing an information processing program for causing a computer to execute:
   first display for displaying, on a display screen, an image, viewed from a virtual camera, of a first object positioned in a virtual three dimensional space;
   detection for detecting a designation point represented in two dimensional coordinates by using an output signal from a pointing device;
   virtual plane setting for setting a predetermined virtual plane between the virtual camera and the first object;
   conversion for converting, by a predetermined calculation process, the designation point detected in the detection to a control point on the virtual plane set in the virtual plane setting, represented in arbitrary three dimensional coordinates;
   second display for displaying a second object different from the first object, at a position in the virtual three dimensional space indicated by the control point;
   first control for controlling a movement of the first object, based on the control point obtained in the conversion; and
   second control for controlling a movement of the second object in accordance with the movement of the first object controlled in the first control.

2. The non-transitory computer readable storage medium according to claim 1, wherein the first control controls a movement of a part of the first object.

3. The non-transitory computer readable storage medium according to claim 2, wherein the first control controls the movement of the part of the first object so as to change the direction of the part of the first object.

4. An information processing apparatus comprising:
   first display programmed logic circuitry for displaying, on a display screen, an image, viewed from a virtual camera, of a first object positioned in a virtual three dimensional space;
   a pointing device for designating an arbitrary point on the display screen by an operator;
   detection programmed logic circuitry for detecting a designation point represented in two dimensional coordinates by using an output signal from the pointing device;
   virtual plane setting programmed logic circuitry for setting a predetermined virtual plane between the virtual camera and the first object;
   conversion programmed logic circuitry for converting, by a predetermined calculation process, the designation point detected by the detection programmed logic circuitry to a control point on the virtual plane set by the virtual plane setting programmed logic circuitry, represented in arbitrary three dimensional coordinates;
   second display programmed logic circuitry for displaying a second object different from the first object, at a position in the virtual three dimensional space indicated by the control point;
   first control programmed logic circuitry for controlling a movement of the first object, based on the control point obtained by the conversion programmed logic circuitry; and
   second control programmed logic circuitry for controlling a movement of the second object in accordance with the movement of the first object controlled by the first control programmed logic circuitry.

5. An information processing method comprising:
   first display for displaying, on a display screen, an image, viewed from a virtual camera, of a first object positioned in a virtual three dimensional space;
   detection for detecting a designation point represented in two dimensional coordinates by using an output signal from a pointing device;
   virtual plane setting for setting a predetermined virtual plane between the virtual camera and the first object;
   conversion for converting, by a predetermined calculation process, the designation point detected in the detection to a control point on the virtual plane set in the virtual plane setting, represented in arbitrary three dimensional coordinates;
   second display for displaying a second object different from the first object, at a position in the virtual three dimensional space indicated by the control point;
   first control for controlling a movement of the first object, based on the control point obtained in the conversion; and
   second control for controlling a movement of the second object in accordance with the movement of the first object controlled in the first control.

6. An information processing system comprising:
   first display programmed logic circuitry for displaying, on a display screen, an image, viewed from a virtual camera, of a first object positioned in a virtual three dimensional space;
   a pointing device for designating an arbitrary point on the display screen by an operator;
   detection programmed logic circuitry for detecting a designation point represented in two dimensional coordinates by using an output signal from the pointing device;
   virtual plane setting programmed logic circuitry for setting a predetermined virtual plane between the virtual camera and the first object;
   conversion programmed logic circuitry for converting, by a predetermined calculation process, the designation point detected by the detection programmed logic circuitry to a control point on the virtual plane set by the virtual plane setting programmed logic circuitry, represented in arbitrary three dimensional coordinates;
   second display programmed logic circuitry for displaying a second object different from the first object, at a position in the virtual three dimensional space indicated by the control point;
   first control programmed logic circuitry for controlling a movement of the first object, based on the control point obtained by the conversion programmed logic circuitry; and
   second control programmed logic circuitry for controlling a movement of the second object in accordance with the movement of the first object controlled by the first control programmed logic circuitry.

7. A non-transitory computer readable storage medium storing an information processing program for causing a computer to execute:
   display for displaying, on a display screen, an image, viewed from a virtual camera, of an object positioned in a virtual three dimensional space;
   detection for detecting a designation point represented in two dimensional coordinates by using an output signal from a pointing device;
   first conversion for converting the designation point to a first control point represented in three dimensional coordinates, by using a first virtual plane positioned in front of the virtual camera in the virtual three dimensional space;
   second conversion for converting the designation point to a second control point represented in three dimensional coordinates, by using a second virtual plane positioned in front of the virtual camera and between the virtual camera and the first virtual plane in the virtual three dimensional space; and
   control for controlling a movement of the object, by using the first control point and the second control point.

8. The non-transitory computer readable storage medium according to claim 7, wherein the object can be deformed.

9. The non-transitory computer readable storage medium according to claim 8, wherein,
   the object has at least two portions whose movements can be separately controlled, and
   the control controls one of the movements of the at least two portions in accordance with the first control point, and controls the other one of the movements of the at least two portions in accordance with the second control point.

10. An information processing apparatus comprising:
    a display screen for displaying an image;
    a pointing device for designating an arbitrary point on the display screen by an operator;
    display programmed logic circuitry for displaying, on the display screen, an image, viewed from a virtual camera, of an object positioned in a virtual three dimensional space;
    detection programmed logic circuitry for detecting a designation point represented in two dimensional coordinates by using an output signal from the pointing device;
    first conversion programmed logic circuitry for converting the designation point to a first control point represented in three dimensional coordinates, by using a first virtual plane positioned in front of the virtual camera in the virtual three dimensional space;
    second conversion programmed logic circuitry for converting the designation point to a second control point represented in three dimensional coordinates, by using a second virtual plane positioned in front of the virtual camera and between the virtual camera and the first virtual plane in the virtual three dimensional space; and
    control programmed logic circuitry for controlling a movement of the object, by using the first control point and the second control point.

11. An information processing method comprising:
    display for displaying, on a display screen, an image, viewed from a virtual camera, of an object positioned in a virtual three dimensional space;
    detection for detecting a designation point represented in two dimensional coordinates by using an output signal from a pointing device;
    first conversion for converting the designation point to a first control point represented in three dimensional coordinates, by using a first virtual plane positioned in front of the virtual camera in the virtual three dimensional space;
    second conversion for converting the designation point to a second control point represented in three dimensional coordinates, by using a second virtual plane positioned in front of the virtual camera and between the virtual camera and the first virtual plane in the virtual three dimensional space; and
    control for controlling a movement of the object, by using the first control point and the second control point.

12. An information processing system comprising:
    a display screen for displaying an image;
    a pointing device for designating an arbitrary point on the display screen by an operator;
    display programmed logic circuitry for displaying, on the display screen, an image, viewed from a virtual camera, of an object positioned in a virtual three dimensional space;
    detection programmed logic circuitry for detecting a designation point represented in two dimensional coordinates by using an output signal from the pointing device;
    first conversion programmed logic circuitry for converting the designation point to a first control point represented in three dimensional coordinates, by using a first virtual plane positioned in front of the virtual camera in the virtual three dimensional space;
    second conversion programmed logic circuitry for converting the designation point to a second control point represented in three dimensional coordinates, by using a second virtual plane positioned in front of the virtual camera and between the virtual camera and the first virtual plane in the virtual three dimensional space; and
    control programmed logic circuitry for controlling a movement of the object, by using the first control point and the second control point.

* * * * *